(12) United States Patent
Jegal et al.

(10) Patent No.: US 9,262,053 B2
(45) Date of Patent: Feb. 16, 2016

(54) PROVIDING INFORMATION ASSOCIATED WITH A PLURALITY OF COMMUNICATION ACCOUNTS OF A USER OF A MOBILE TERMINAL

(75) Inventors: Yun Jegal, Seoul (KR); Soon Young Rhew, Seoul (KR); Yong Sung Park, Gyeonggi-do (KR); Hyun Seok Seo, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 506 days.

(21) Appl. No.: 13/025,778

(22) Filed: Feb. 11, 2011

(65) Prior Publication Data

US 2011/0197163 A1    Aug. 11, 2011

Related U.S. Application Data

(60) Provisional application No. 61/303,505, filed on Feb. 11, 2010.

(30) Foreign Application Priority Data

Jan. 26, 2011    (KR) .................. 10-2011-0007787

(51) Int. Cl.
| | | |
|---|---|---|
| *G06F 3/0482* | (2013.01) | |
| *H04M 1/725* | (2006.01) | |
| *H04M 1/2745* | (2006.01) | |
| *H04W 4/20* | (2009.01) | |
| *G06Q 10/10* | (2012.01) | |

(52) U.S. Cl.
CPC ......... *G06F 3/0482* (2013.01); *H04M 1/72547* (2013.01); *H04W 4/206* (2013.01); *G06Q 10/109* (2013.01); *H04M 1/274508* (2013.01); *H04M 1/274533* (2013.01); *H04M 2250/60* (2013.01)

(58) Field of Classification Search
CPC . G06Q 10/10; G06Q 10/109; G06Q 10/1093; H04M 1/274508; H04M 1/274533; H04M 1/72547; H04M 2250/60; H04W 4/206; G06F 3/0482
USPC .................................................. 715/738, 739
See application file for complete search history.

(56) References Cited

U.S. PATENT DOCUMENTS

| | | | |
|---|---|---|---|
| 7,673,327 B1 * | 3/2010 | Polis et al. ................... | 726/5 |
| 8,135,392 B2 * | 3/2012 | Marcellino et al. ........... | 455/418 |

(Continued)

FOREIGN PATENT DOCUMENTS

| | | |
|---|---|---|
| CN | 1809093 A | 7/2006 |
| CN | 101627349 A | 1/2010 |

(Continued)

*Primary Examiner* — Kieu Vu
*Assistant Examiner* — Blaine Basom
(74) *Attorney, Agent, or Firm* — Cha & Reiter, LLC.

(57) ABSTRACT

An information provision method and apparatus of a mobile terminal is provided for managing and providing information items associated with a plurality of communication accounts of a user in an integrated manner. An information provision method for a mobile terminal includes configuring a plurality of identity informations associated with communications of a specific contact item; detecting an input for selecting an integrated contact management menu; and displaying the identity informations or communication informations associated with individual identity informations in an integrated manner.

19 Claims, 31 Drawing Sheets

(56) References Cited

U.S. PATENT DOCUMENTS

| | | | |
|---|---|---|---|
| 8,239,290 B2* | 8/2012 | Berger et al. | 705/27.1 |
| 8,370,769 B2 | 2/2013 | Vance et al. | |
| 2005/0193345 A1* | 9/2005 | Klassen et al. | 715/751 |
| 2006/0085483 A1* | 4/2006 | Mooney et al. | 707/200 |
| 2007/0214180 A1* | 9/2007 | Crawford | 707/104.1 |
| 2008/0182563 A1* | 7/2008 | Wugofski et al. | 455/414.2 |
| 2008/0242362 A1* | 10/2008 | Duarte | 455/566 |
| 2008/0261569 A1* | 10/2008 | Britt et al. | 455/414.1 |
| 2009/0040875 A1* | 2/2009 | Buzescu et al. | 368/29 |
| 2009/0177744 A1* | 7/2009 | Marlow et al. | 709/204 |
| 2009/0209286 A1* | 8/2009 | Bentley et al. | 455/556.1 |
| 2009/0313299 A1* | 12/2009 | Bonev et al. | 707/103 R |
| 2010/0151881 A1* | 6/2010 | Jang et al. | 455/456.1 |
| 2010/0153284 A1* | 6/2010 | Hoag et al. | 705/319 |
| 2011/0087970 A1* | 4/2011 | Swink et al. | 715/752 |
| 2013/0263015 A1* | 10/2013 | Doudkin et al. | 715/752 |

FOREIGN PATENT DOCUMENTS

| | | |
|---|---|---|
| KR | 10-0711523 B1 | 4/2007 |
| KR | 10-2008-0113353 A | 12/2008 |
| WO | 2007/008321 A2 | 1/2007 |

* cited by examiner

FIG. 9
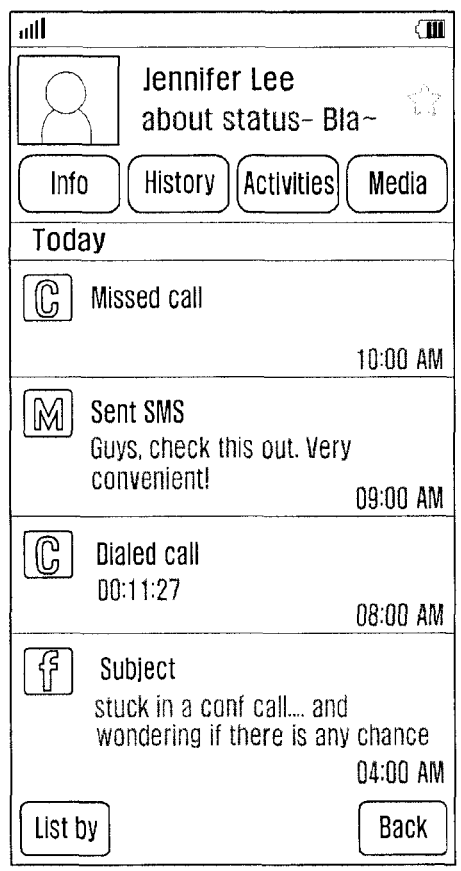
[a]
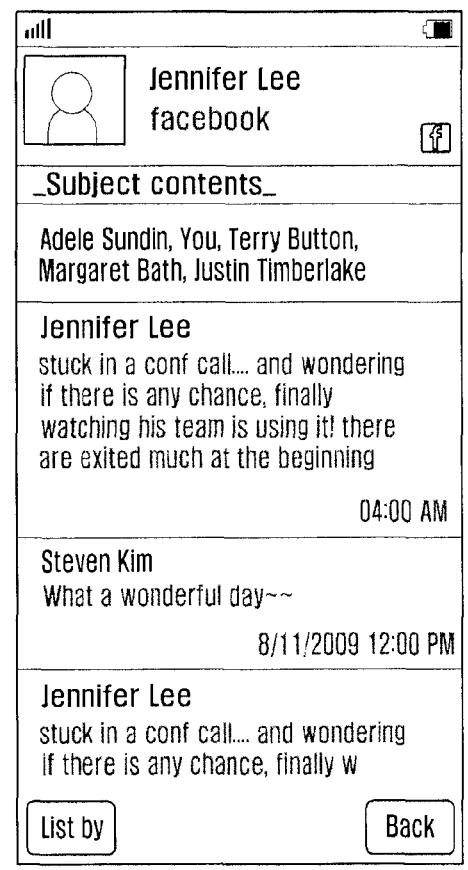
[b]

FIG. 18
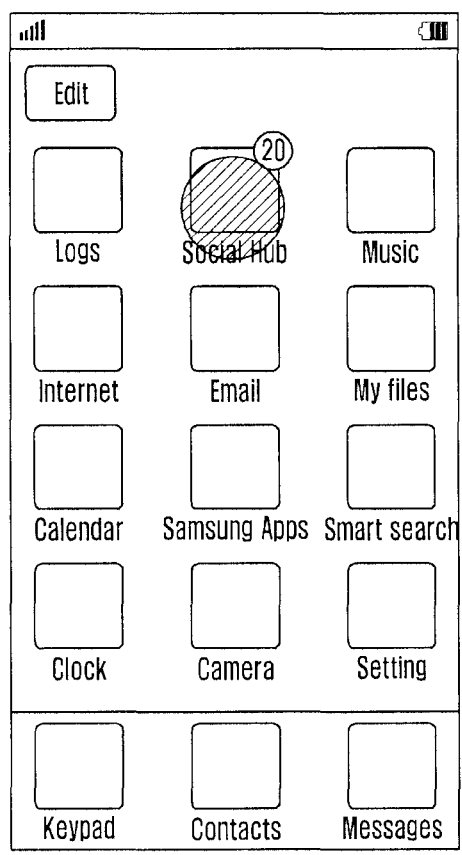
[a]
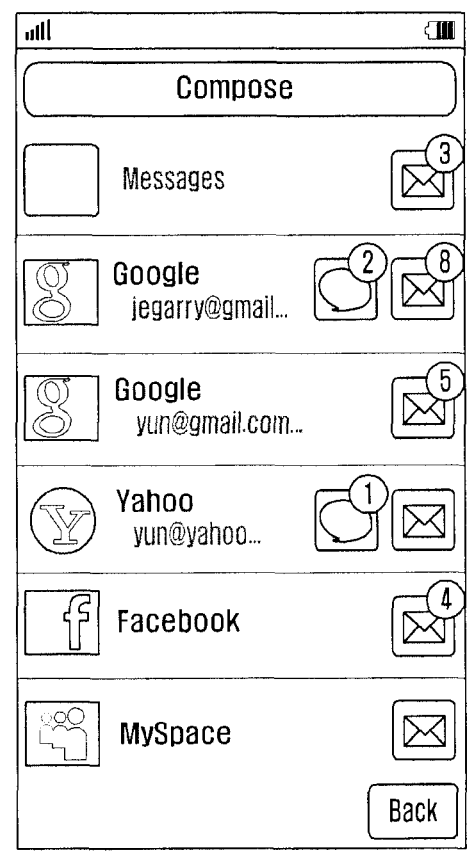
[b]

FIG. 19
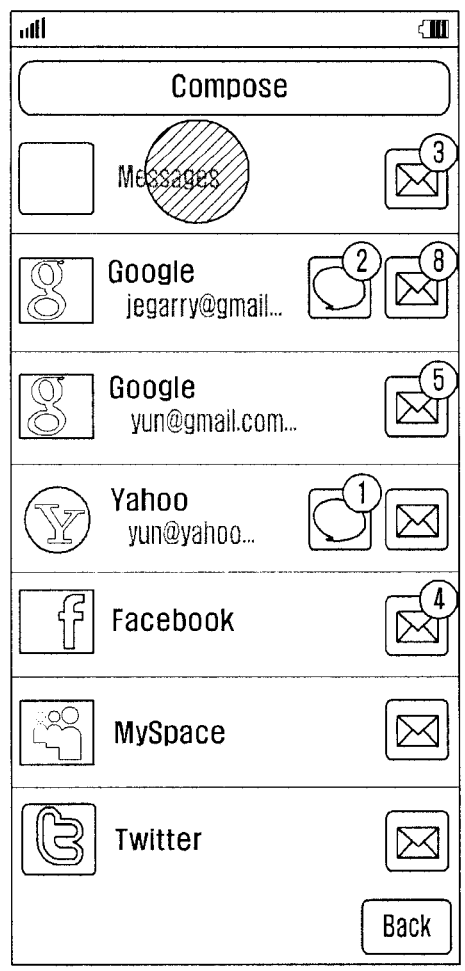
[a]
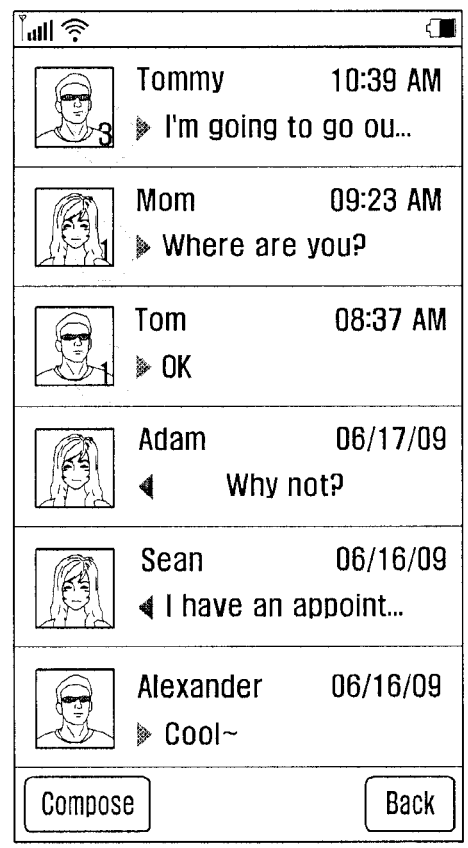
[b]

FIG. 20
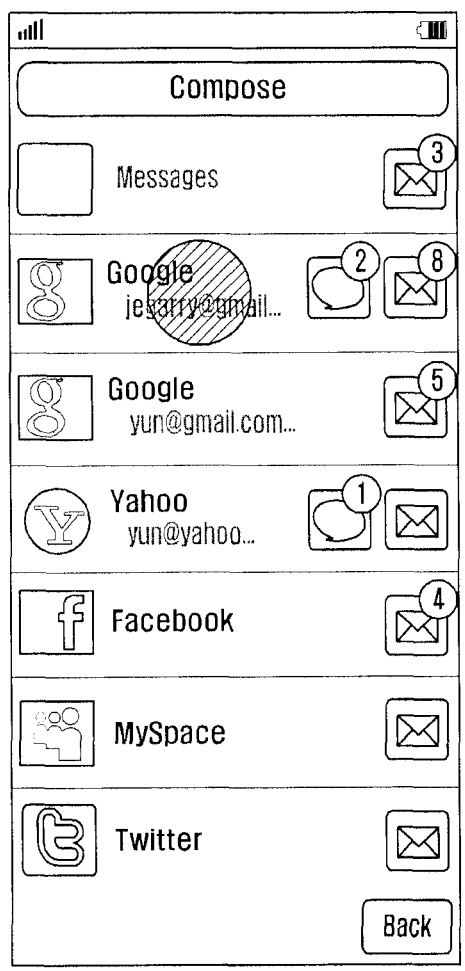
[a]
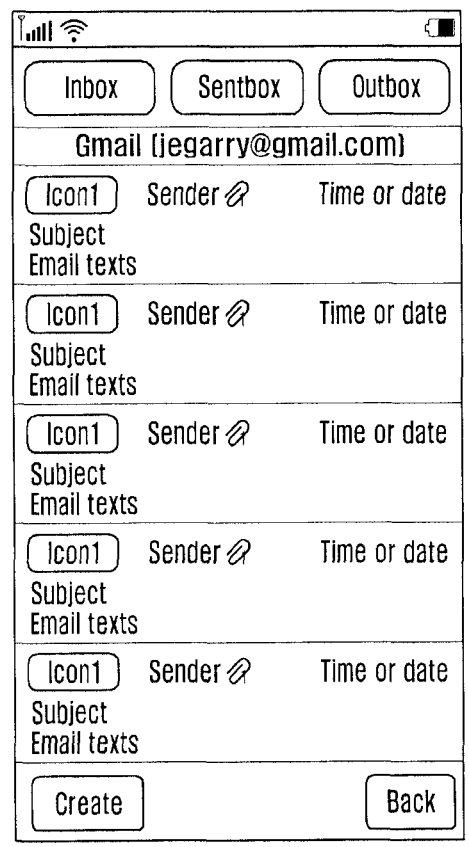
[b]

FIG. 21
[a]
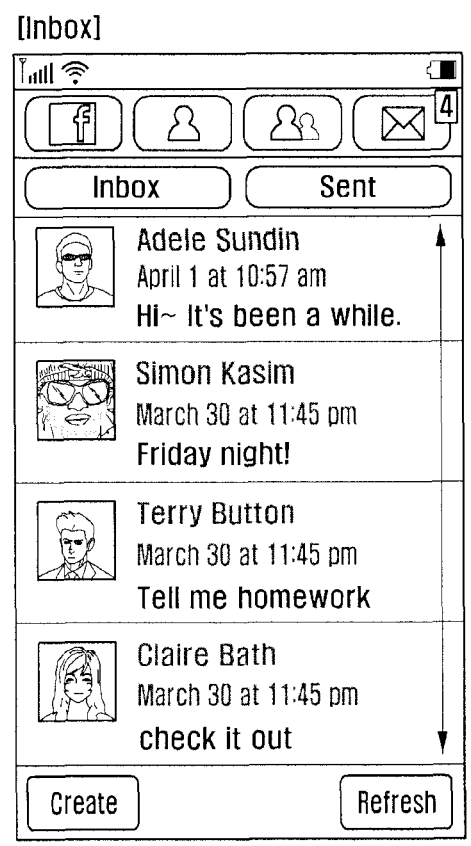
[b]

FIG. 23
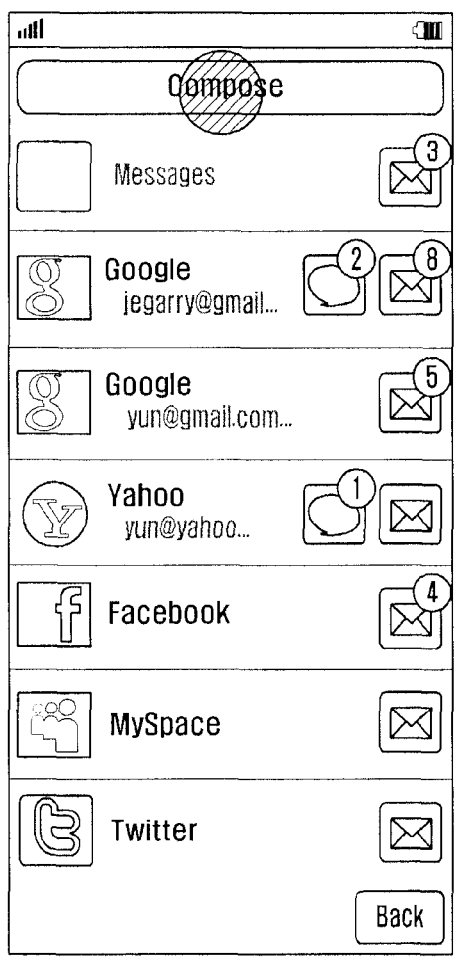
[a]
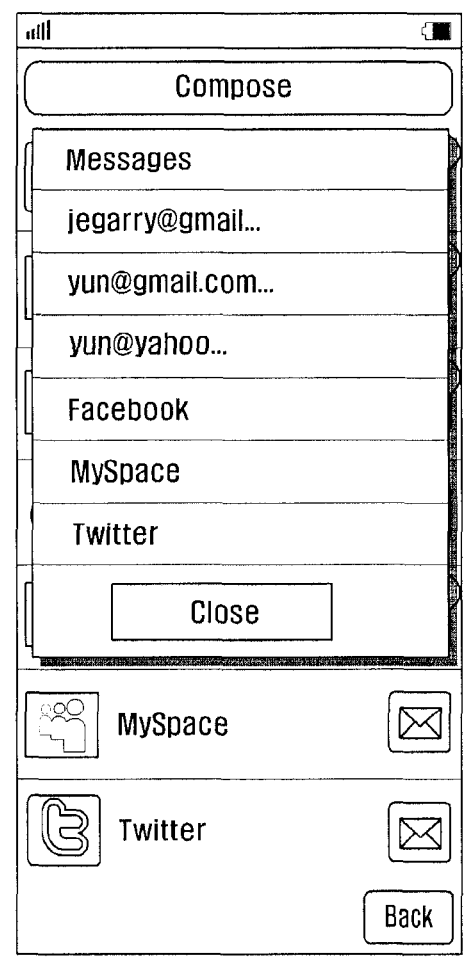
[b]

FIG. 29
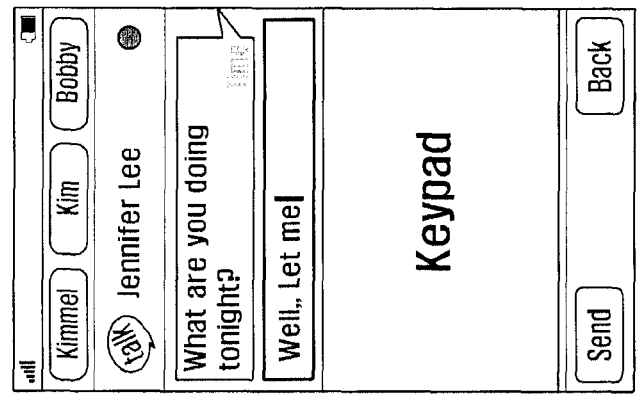
[d]
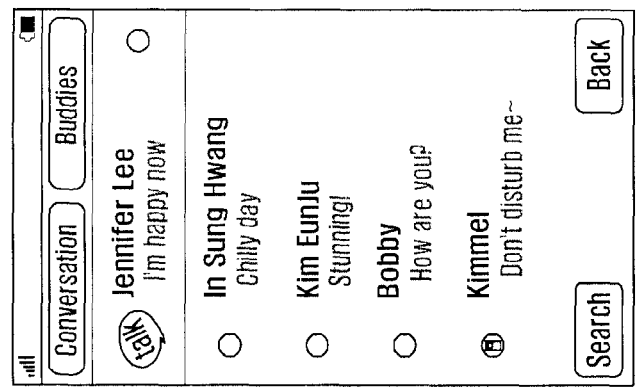
[c]
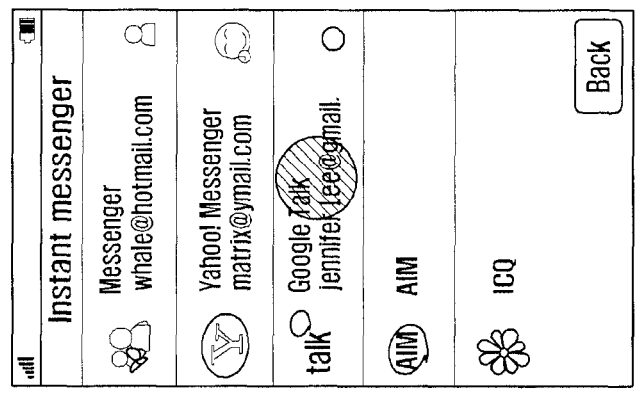
[b]
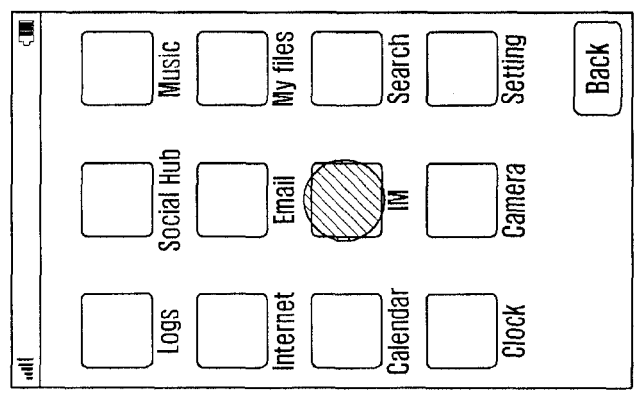
[a]

PROVIDING INFORMATION ASSOCIATED WITH A PLURALITY OF COMMUNICATION ACCOUNTS OF A USER OF A MOBILE TERMINAL

CLAIM OF PRIORITY

The present application is based on prior U.S. application Ser. No. 61/303,505, filed on Feb. 11, 2010 and an earlier filed Korean Application No. 10-2011-0007787 filed on Jan. 26, 2011, which are hereby incorporated by reference and priority thereto for common subject matter is hereby claimed.

BACKGROUND OF THE INVENTION

1. Field of the Invention

The present invention relates to a mobile terminal and, in particular, to an information provision method and apparatus of a mobile terminal for managing and providing information associated with a plurality of communication accounts of a user in an integrated manner.

2. Description of the Related Art

With its widespread use, a mobile phone has become one of the indispensable tool in modern life. Recently, the mobile phones have evolved into multifunctional communication terminals capable of supporting various supplementary services as well as basic voice communication service.

Owing to the functional expansion of the mobile terminal, it has become possible to use the mobile terminal for accessing various communication services such as Short Message Service (SMS), Multimedia Message Service (MMS), Email, Social Network Service (SNS), and Instant Messenger (IM). In order to use one of such communication services, the user has to execute the corresponding application, i.e. one of the SMS, MMS, Email, SNS, and IM applications that are available in the mobile terminal. Accordingly, during a multiple communication service mode, the user has to activate and deactivate each application independently for operation, thus resulting in user inconvenience.

SUMMARY OF THE INVENTION

In order to solve the problems of the prior arts, the present invention provides an information provision method and apparatus capable of improving user convenience by managing and providing information on plural communication accounts via an integrated communication accounts menu screen.

In accordance with an aspect of the present invention, an information provision method for a mobile terminal to manage a plurality of communication accounts includes configuring a plurality of identity information items associated with a specific contact item; detecting an input for selecting an integrated contact management menu; and displaying the identity information items or communication information items associated with individual identity information items in an integrated manner.

In accordance with another aspect of the present invention, an information provision method for a mobile terminal to manage a plurality of communication accounts includes registering multiple identity information items of a user; detecting an input for selecting an integrated identity management menu; and displaying communication information items associated with the registered identity information items in an integrated manner.

In accordance with still another aspect of the present invention, a mobile terminal includes a control unit which configures a plurality of identity information items associated a specific contact or user; an input unit which receives an input for selecting an integrated contact management menu or an integrated identity management menu; and a display unit which displays the configured identity information items or communication information items associated with the individual identity information item.

BRIEF DESCRIPTION OF THE DRAWINGS

The above features and advantages of the present invention will be more apparent from the following detailed description in conjunction with the accompanying drawings, in which:

FIG. 9 is a diagram illustrating exemplary screen images corresponding to the history menu-related process of the information provision method of FIG. 2;

FIG. 18 is a diagram illustrating exemplary screen images corresponding to the communication menu item-related process of the information provision method of FIG. 16;

FIG. 19 is a diagram illustrating exemplary screen images displayed in series when the messaging service account item is selected in the message checking process of the information provision method of FIG. 16;

FIG. 20 is a diagram illustrating exemplary screen images displayed in series when a web account item is selected in the message checking process of the information provision method of FIG. 16;

FIG. 21 is a diagram illustrating exemplary screen images displayed in series when an SNS account item is selected in the message checking process of the information provision method of FIG. 16;

FIG. 23 is a diagram illustrating exemplary screen images displayed in series when the composition menu item is selected in the message checking process of the information provision method of FIG. 16;

FIG. 29 is a diagram illustrating exemplary screen images provided for an information provision method according to another embodiment of the present invention;

DETAILED DESCRIPTION OF THE INVENTION

Figure 1:
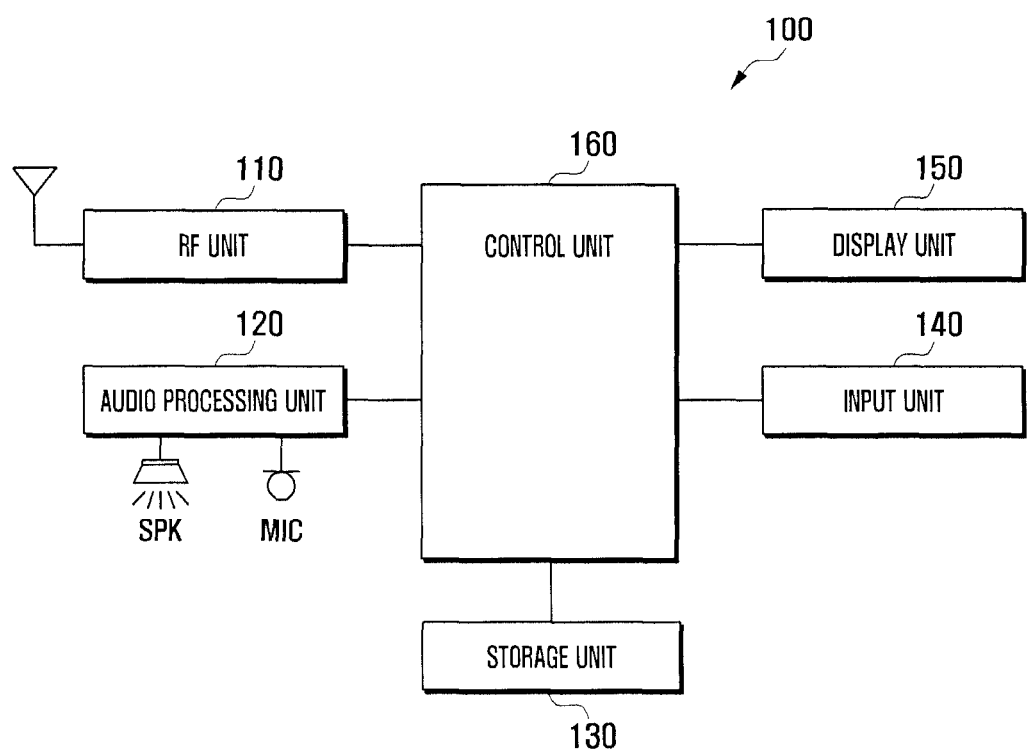
FIG. 1 is a block diagram illustrating a configuration of a mobile terminal according to an embodiment of the present invention.

To help understand the invention, the following definitions are used:

The term "contact" refers to a counterpart in communication with the mobile terminal user as one of the items in a contact list.

The term "identity (ID) information" refers to the information necessary for communication which includes phone number, email account, SNS account, IM account, etc.

The term "contact information" refers to the basic information related to each contact which includes the information on the contact name, phone number, email account, SNS account, IM account.

The term "communication information or communication history information" refers to the information relating to communication accounts and/or information on the communication history with a specific contact which includes communication history, outgoing and incoming SMS message, outgoing and incoming MMS message, outgoing and incoming email, SMS upload message, IM history, etc.

The term "contents" refers to a product including photo file, music file, motion picture file, etc. that can be stored in the mobile terminal and uploaded on a contents upload menu of SNS application and IM application.

The term "integrated contact management menu" refers to the menu for managing the communication information about multiple IDs and communication histories associated with each ID to be provided to the user in an integrated manner.

The term "integrated ID management menu" is the menu for managing the communication histories of the individual IDs registered by the mobile terminal user to be provided to the user in an integrated manner. In the present invention, the integrated ID management menu is used to refer to a general term including the integrated communication menu and integrated SNS menu.

The term "integrated communication menu refers to the menu, as one of the main menu items of the mobile terminal, for managing the messages, emails, SNS messages, IM messages to be provided to the user in an integrated manner. The integrated communication menu can include menu items such as outgoing and incoming SMS, outgoing and incoming MMS, outgoing and incoming email, SNS upload message, and IM application activation. The integrated communication menu also can include the menu items such as SMS/MMS composition, email composition, and SNS message composition.

The term "integrated SNS menu" refers to the menu for managing the communication information associated with the SNS account to be provide to the user in an integrated manner. The user can check the SNS messages uploaded by a plurality of SNS applications integrally with the integrated SNS menu.

The term "integrated IM menu" refers to the menu for managing the IM IDs of the mobile terminal user, updating the presence in real time, and providing a chatting environment.

Now, exemplary embodiments of the present invention are described with reference to the accompanying drawings in detail. The same reference numbers are used throughout the drawings to refer to the same or like parts. For the purposes of clarity and simplicity, detailed description of well-known functions and structures incorporated herein may be omitted to avoid obscuring the subject matter of the present invention.

The mobile terminal according to an embodiment of the present invention can be any of data communication and multimedia playback devices including a mobile phone, a Portable Multimedia Player (PMP), a Personal Digital Assistant (PDA), a Smartphone, and an MP3 player.

FIG. 1 is a block diagram illustrating a configuration of a mobile terminal according to an embodiment of the present invention. The mobile terminal 100 according to an embodiment of the present invention includes a Radio Frequency (RF) unit 110, an audio processing unit 120, a storage unit 130, an input unit 140, a display unit 150, and a control unit 160.

The RF unit 110 is responsible for transmitting and receiving radio signal carrying data. The RF unit 110 can include an RF transmitter for up-converting and amplifying the transmit radio frequency signal and an RF receiver for low noise amplifying and down-converting the receive radio frequency signal. The RF unit 110 delivers the data received on a radio channel to the control unit 160 and transmits the data output by the control unit 160 on the radio channel. In the embodiment, the RF unit 1010 receives and transmits the radio signals carrying SMS message, MMS message, and email, and further establishes a connection to an SNS server for registering the upload message and to an IM server for exchanging instant messages. In the embodiment, the RF unit 110 can be implemented as a short range communication module such as Bluetooth module, Near Field Communication (NFC) module, ZigBee module, Radio Frequency Identification (RFID) module, Infrared Networking module, and a WiFi module.

The audio processing unit 120 can include a suite of codecs, and the codecs can include a data codec for processing packet data and an audio codec for processing audio signals including voice. The audio processing unit 120 converts the digital audio signal to analog audio signal by means of the audio codec and the input analog audio signal to digital audio signal by means of the audio codec.

The storage unit 130 stores the programs and data associated with the operations of the mobile terminal 100 and can be divided into a program region and a data region. The program region stores Operating System (OS) for booting up the mobile terminal, programs for controlling the general operations of the mobile terminal 100, application programs for playing multimedia contents, and other application programs for supporting other supplementary functions such as camera function, sound playback function, still and motion picture playback function. The data region is the storage space for storing the application data such as still and motion pictures, phonebook data, and audio data.

The input unit 140 receives the key manipulation signal input by the user and delivers a corresponding key sequence to the control unit 160. The input unit 140 can be implemented with any one of a 3×4 keypad, a QWERTY keypad having a plurality of alphanumeric keys, navigation keys, and a touch panel. The input unit 140 also can include at least one of button key, jog key, and wheel key.

The display unit 150 can be implemented with one of a Liquid Crystal Display (LCD), an Organic Light Emitting Diodes (OLED), and an Active Matrix Organic Light Emitting Diodes (AMOLED) to provide the user with the information such as menu, input data, function setting status, and others in a visual format. The display unit 150 displays the booting progress screen, idle mode screen, menu screen, call processing screen, and other application execution screens.

The control unit 160 controls entire operations of the function blocks of the mobile terminal. In the embodiment, the control unit 160 configures a plurality of contact items associated with each contact and controls, in response to the selection of the integrated contact management menu, the display unit to display the plural contact information items or the communication information items of the individual contact information items in an integrated manner. That is, the control unit 160 manages the contact information items such as the phone number, the email account, and the SNS account in an integrated manner and provides the communication information related to the contact information items in an integrated manner in the integrated contact management menu.

In another embodiment of the present invention, the control unit 160 registers a plurality of ID information items, which may also include contact items of the mobile terminal user and controls, when the integrated ID management menu is selected, the display unit 150 to display the registered ID information items and the communication information items associated with the individual ID information items. That is, the control unit 160 manages the ID information items such as the email account and the SNS account registered along with the mobile terminal user in the integrated ID management menu and provides the communication information in association with the individual ID information items in an integrated manner.

Figure 2:
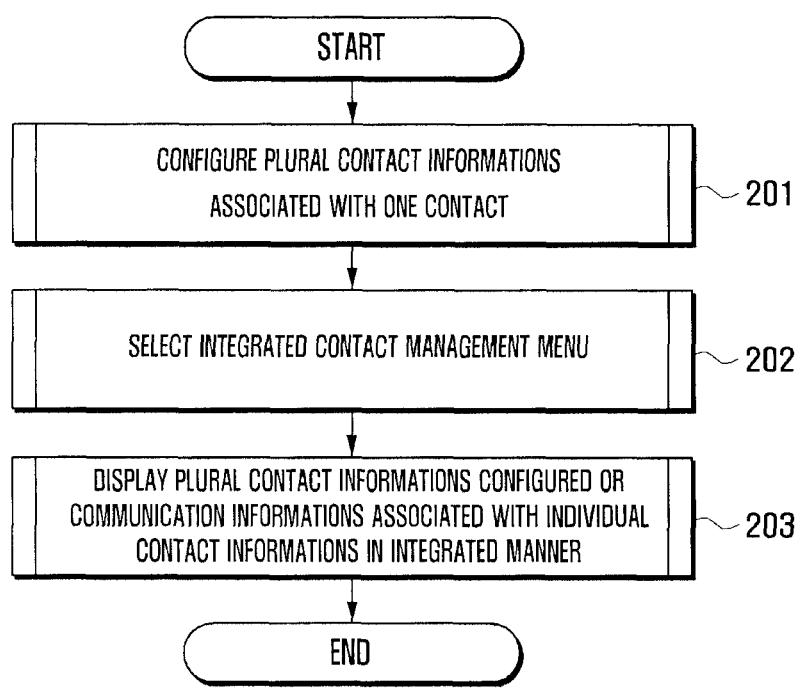
FIG. 2 is a flowchart illustrating an information provision method of a mobile terminal 100 according to an embodiment of the present invention.

FIG. 2 is a flowchart illustrating an information provision method of a mobile terminal 100 according to an embodiment of the present invention.

Referring to FIG. 2, the control unit 160 first configures a contact item with a plurality of contact information items (201). In the embodiment, a contact information item is the basic information item associated with the contact item and includes ID information such as contact name, phone number, email account, SNS account, and IM account.

The control unit 160 can configure a specific contact item along with a plurality of contact information items in a contact creation menu and make links the individual contact information items to a contact items so as to create a contact item composed of a plurality of contact information items. Detailed steps of procedure 201 will be described later with reference FIG. 3.

Thereafter, the control unit 160 monitors to detect an input for selecting the integrated contact management menu (202). In the embodiment, the integrated contact management menu is the menu for managing the plural ID information items or communication information items associated with the individual ID information items so as to be provided to the user in an integrated manner. The integrated contact management menu can be a contact list menu representing one of the main menus of the mobile terminal 100 which includes the submenus including the contact info menu, history menu, activities menu, and media menu. If the user selects the integrated contact management menu, the control unit 160 displays a contact list on the display unit 150 such that the user can select one of the contact items from the contact list. Detailed steps of procedure 202 will be described later with reference to FIG. 6.

Next, the control unit 160 controls such that the contact information items configured at step 201 or the communication information items associated with individual contact information items are displayed by means of the display unit 150 in an integrated manner (203). If one of the contact items is selected by the user in the integrated contact management menu, the control unit 160 controls the display unit 150 to display the plural contact information items configured in response to the user request or the communication information items associated with individual contact information items. The integrated contact management menu is provided with a plurality submenus such that, when a submenu is selected by the user, the control unit 160 controls the display unit 150 to display the contact information items or the communication information items associated with the contact information items according to the selected submenu. Detailed steps of procedure 203 will be described later with reference to FIG. 7.

Figure 3:
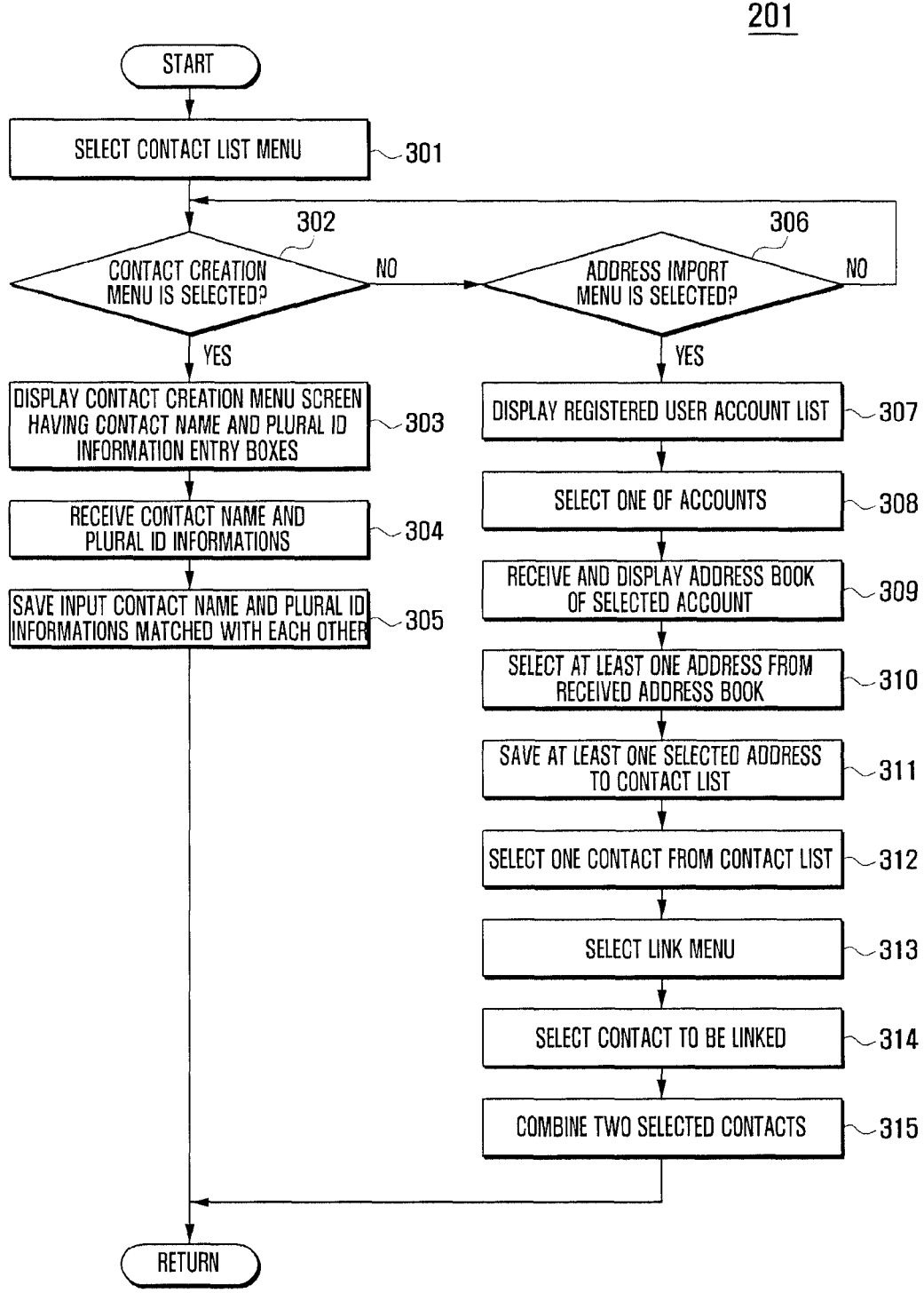
FIG. 3 is a flowchart illustrating detailed process of step 201 of FIG. 2.

FIG. 3 is a flowchart illustrating detailed steps of procedure 201 of FIG. 2.

Referring to FIG. 3, the control unit 160 monitors to detect an input for selecting a contact list menu item (301). The main menu of the mobile terminal 100 includes the contact list menu item providing the contact list menu screen in which the user can check the contact information items of the previously registered contact items and registers new contact information items. Once the contact list menu item is selected, the control unit 160 controls the display unit 150 to display the contact list menu screen having the contact list which is previously registered in the mobile terminal 100. When the previously registered contact list menu screen is displayed by the display unit 150, the control unit 160 can control such that the list of the contact items linked to the selected contact item and the presence states of the corresponding IMs is displayed. The list of the linked contact items can be presented as the web and SNS items. The contact list menu screen may include a contact creation menu item or an address import menu item. The contact creation menu item provides a contact creation menu screen which allows the user to enter characters to register the contact name and ID information, and the address import menu item provides an address import menu screen allows registering the address directory of a web account or a SNS account as the contact item. In the embodiment, the contact creation menu item and the address import menu item can be provided in the form of hidden menus in the contact list menu screen. If a hidden menu show key is input while the contact list menu screen is presented, the control unit 160 controls such that the contact creation menu item and the address import menu item appear on the screen.

While the contact creation menu item and the address import menu item are shown, the control unit 160 monitors to detects a user input and, if a user input is detected, determines whether the user input is the contact creation menu item selection command (302). If the user input is the contact creation menu item selection command, the control unit 160 controls the display unit 150 to display the contact creation menu screen having a contact name and a plurality of ID entry boxes (303). The contact creation menu screen can include a photo entry box, a contact name entry box, a phone number entry box, an email account entry box, an IM ID entry box, a storage selection box, a group selection box, a ringtone selection, a field addition menu item.

The user can enter the information on contact name, phone number, email account, and IM ID by means of the input unit 140, and the control unit 160 registers the information on the contact name and multiple ID information items input by the user (304). Once the information input has been completed, the control unit 160 stores the input contact name and multiple ID information items in the storage unit 130 (305). For example, if the user has entered the phone number, the email account, and the IM ID as the ID information items in the contact creation menu screen, the control unit 160 stores the phone number, email account, and IM ID in association with the contact name.

If the user input is not the contact creation menu item selection command at step 302, the control unit 160 determines whether the user input is the address import menu item selection command (306). If the user input is the address import menu item selection command, the control unit 160 controls the display unit 150 to display the address import menu screen having the list of the user accounts that are previously registered in the mobile terminal (307). The user account list can include at least one of email account, SNS account, and IM account. In case that there is no user account, the control unit 160 controls such that an account registration menu item on the display unit 150. If the user selects the account registration menu item, the control unit 150 controls to display a web list, SMS list, and IM list such that, when the user select one of the list, an account and a password entry boxes are displayed. If the user enters the account and password, the control unit 160 creates the user account list having the newly registered account.

If a user account is selected from the user account list (308), the control unit 160 controls such that the address book of the selected user account is imported and displayed on the display unit 150 (309). The control unit 160 synchronizes the address book of the selected user account with the contact list and accesses the server managing the selected user account by means of the RF unit 110 to receive the address book registered along with the account. Next, the control unit 160 controls such that the received address bock is displayed on the display 150. The address book can be displayed with selection boxes for selecting each and all of the items. Here, the user can select at least one item to be added to the contact list.

After displaying the address book, the control unit 160 monitors to detects a user input for selecting at least one of the addresses contained in the address book. If at least one address is selected from the address book (310), the control unit 160 adds the selected address to the contact list (311). When adding the at least one address selected by the user to the contact list, the control unit 160 saves the name of the address as the contact name and the email account of the address as ID information.

In the state where the contact list is displayed, the control unit 160 selects a contact item from the contact list in response to a user input (312) and selects a link menu item in response to another user input (313). It can be configured such that, if the user makes a contact on one of the contact item of the contact list and selects a hidden menu key, a hidden menu window including the link menu item is displayed under the control of the control unit 160. The user can select the link menu in the hidden menu window. Also, it can be configured such that, if the user makes a contact on one of the contact items and then a sweeping action in a direction, the hidden menu window having the link menu item appears on the display unit 150 under the control of the control unit 160. Further, it can be configured such that, if the user makes a contact on one of the contact items, the control unit 160 displays the detailed menu items related to the corresponding contact. The detailed menu items can be displayed along with the link menu items.

Once a link menu item is selected at step 313, the control unit 160 controls such that the contact list is displayed again. At this time, the contact list is displayed in the form of a menu screen for selecting the contact item to be link to the contact item selected at step 312. Next, the control unit 160 selects the contact item to be linked to the contact item selected at step 312 in response to the user input (314) and combines the two contact items (315). At this time, the control unit 160 combines the two contact items into a single contact item. That is, the control unit 160 configures the contact item having one contact name with multiple ID information items. For example, the control unit 160 can configure the contact item with one contact name matched with a phone number, an email account, an SNS account, and an IM account. The contact information can be displayed along with items representing the linked ID information.

Figure 4:
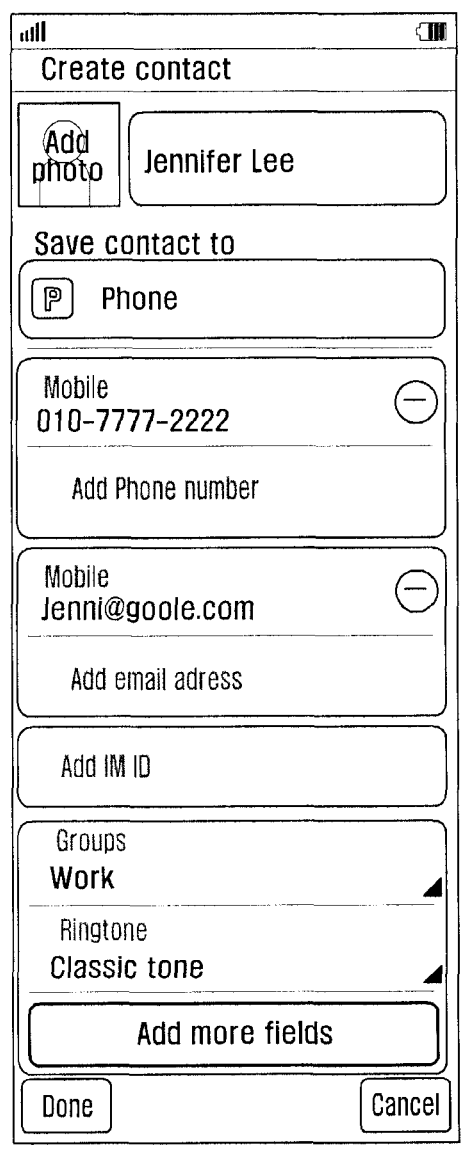
FIG. 4 is a diagram illustrating an exemplary contact creation menu screen provided in the information provision method of FIG. 2.

FIG. 4 is a diagram illustrating an exemplary contact creation menu screen provided in the information provision method of FIG. 2.

As shown in FIG. 4, the contact creation menu screen includes a photo entry box, contact name entry box, contact information storage selection box, phone number entry box, email account entry box, IM ID entry box, group selection box, ringtone selection box, and field addition menu item. The user can enter multiple phone numbers, email accounts, and IM IDs for the contact name of Jennifer Lee.

If the user makes a touch on the "phone" item of the "save contact to" section in the contact creation menu screen of FIG. 4, the control unit 160 controls such that the storage selection menu window having the items of "phone", "SIM", and "jenni@gmail.com" is displayed by the display unit 150. If the item "phone" is selected, the control unit 160 saves the contact information in the storage unit 130 of the mobile terminal 100. If the item "SIM" is selected, the control unit 160 saves the contact information in the SIM. If the item "Jenni@gmail.com" is selected, the control unit 160 updates the address book of the "Jenni@gmail.com" account with the created contact information.

Figure 5:
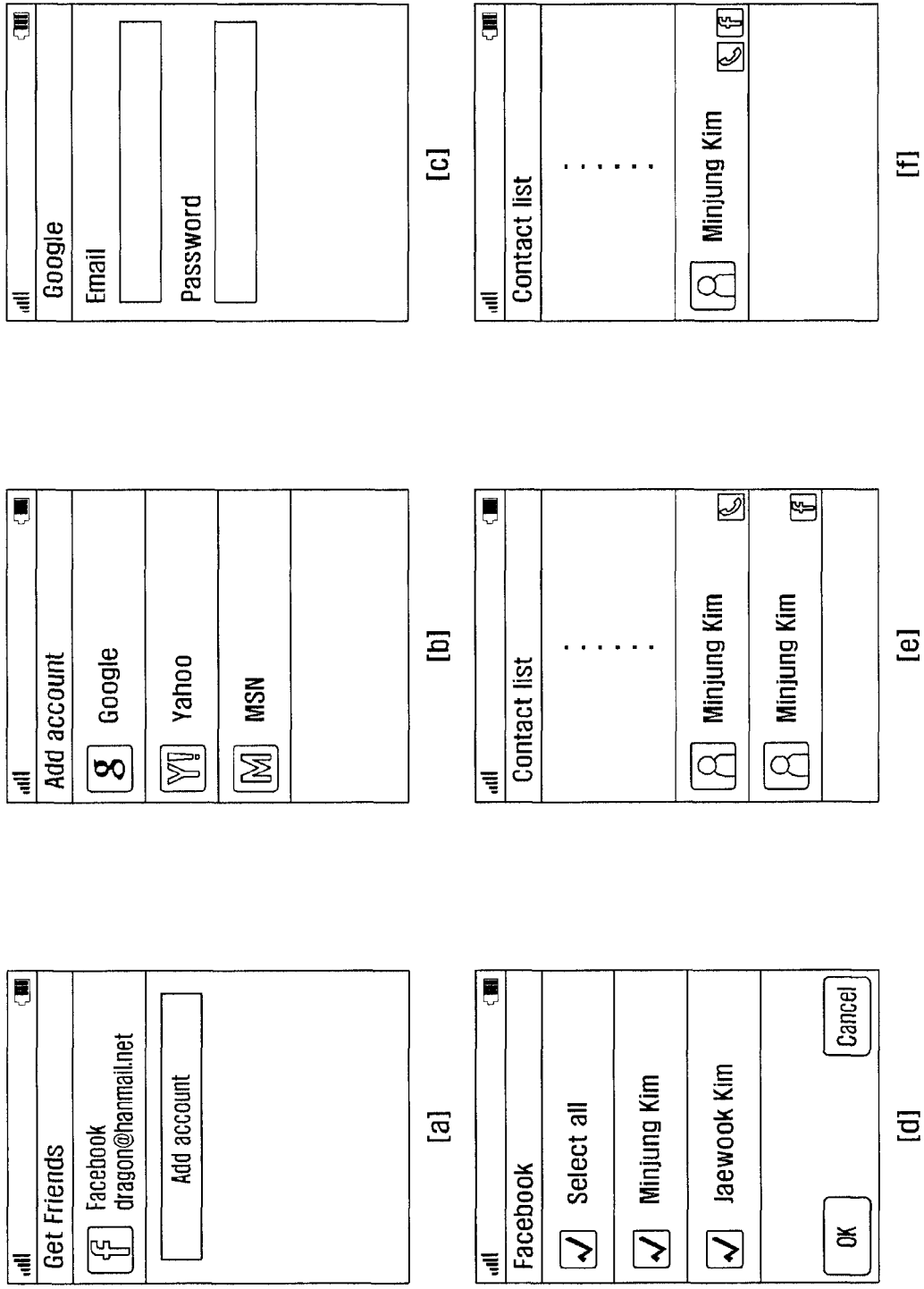
FIG. 5 is a diagram illustrating exemplary screen images corresponding to the address import process of the information provision method of FIG. 2.

FIG. 5 is a diagram illustrating exemplary screen images corresponding to the address import process of the information provision method of FIG. 2.

Part [a] of FIG. 5 shows the screen displayed when the address import menu item is selected from the contact list menu screen. The "Get Friends" is the name of the address import menu, and "Facebook, dragon@hanmail.net" is the SNS account previously registered in the mobile terminal 100. The "Add account" item is the account addition menu item. The user can user the preregistered account by selecting the dragon@hanmail.net and register a new account by selecting the "Add account" menu item.

Part [b] of FIG. 5 shows the screen displayed when the "Add account" menu item is selected form the "Get Friends" menu screen of part [a] of FIG. 5. If the "Add account" menu item is selected, the control unit 160 controls such that the "Add account" menu screen having the list of websites supporting address book sharing is displayed by the display unit 150. Part [b] of FIG. 5 shows an exemplary web list having Google, Yahoo, and MSN that supporting address book sharing.

Part [c] of FIG. 5 shows the screen displayed when one of the websites is selected on the "Add account" menu screen, e.g. Google is selected. If a website is selected from the web list provided on the "Add account" menu screen, the control unit 160 controls such that the website account screen having the account and password entry boxes. In part [c] of FIG. 5, the text box entitled "Email" is the account entry box, and the text box entitled "Password" is the password entry box. If the user enters an account and a password, the control unit 160 creates a new account with the account name and password entered by the user and save the newly added account in the storage unit 130.

Part [d] of FIG. 5 shows the screen displayed when the "Facebook, dragon@hanmail.net" item is selected on the "Get Friends" menu screen of part [a] of FIG. 5. If a previously registered account is selected, the control unit 160 controls such that the account menu screen having the address book of the selected account is displayed. Here, the address book can be displayed along with menu items for selecting each and all of the address items. In part [d] of FIG. 5, the item "Select all" can be marked for selecting all of the address contained in the address bock, and the items "Minjung Kim" and "Jaewook Kim" can be marked for selecting individual addresses. The user can registers all the address contained in the address book with the contact list at a time by selecting the menu item "Select all" or registers each of the address "Minjung Kim" and "Jaewook Kim" with the contact list by selecting the corresponding items one by one.

In an embodiment of the present invention, if the user selects the previously registered account, the control unit 160 controls to display an address book synchronization menu item such that, when the address book synchronization menu item is selected, the mobile terminal 100 accesses, by means of the RF unit 110, the server managing the selected account to receive the address bock and display and displays, by means of the display unit 150, the received address book.

Part [e] of FIG. 5 shows the screen displayed when one of the address item, e.g. "Minjung Kim", is selected on the "Facebook" account menu screen of part [d] of FIG. 5. It is assumed that the address item "Minjung Kim" is listed in the contact list with the ID information of phone number and the contact item registered with the Facebook account of the user is added to the contact list with the address import menu item. In this case, the Minjung Kim item in the contact list is configured with two items (phone number, Facebook). Part [e] of FIG. 5 shows the menu screen showing two contact lists entitled Minjung Kim. One of the two items is displayed with a telephone icon at the right side and the other is displayed with a Facebook logo icon at the right side. The user can recognize, with the telephone icon, that the corresponding list is created through the contact creation menu and the phone number is registered as ID information. Also, the user can recognize, with the Facebook log icon, that the corresponding list is imported from the Facebook address book through the address import menu. If the name registered with the Facebook service, Kim Minjung is presented in the contact list.

If the user selects a contact item and then makes an input for selecting a hidden menu key while the menu screen of part [e] of FIG. 5 is displayed, the control unit 160 controls such that the hidden menu having the link menu appears on the screen. In the embodiment, the link menu is the menu for configuring a contact item by linking a plurality contact items contained in the contact list. If the user selects the link menu, the control unit 160 controls such that the contact list is displayed by means of the display unit 150. Here, the contract list is displayed in the form of a menus screen for selecting at least one contact item to be linked to the previously selected contact item. The user can select at least one contact item to be linked from the display contact list.

Referring to part [e] of FIG. 5, the user selects the Minjung Kim item marked with the telephone icon, the link menu item, and then the Minjung Kim item marked with the Facebook log icon in series to link the two Minjung Kim items.

Alternatively, it can be configured such that, if the user makes a touch on a contact item and then makes a sweeping action in a direction, the hidden menu having the link menu item appears on the screen.

Part [f] of FIG. 5 shows the screen on which two Minjung Kim contact items are configured into a single contact item. The control unit 160 can combine plural contact items selected by the user into one contact item. At this time, the control unit 160 can register the plural ID information items to one contact name. In part [f] of FIG. 5, the Minjung Kim contact item having the telephone icon and the Facebook log icon is displayed. Accordingly, it can be configured such that, if the user selects the Minjung Kim item in the screen of part [f] of FIG. 5, the phone number and Facebook account are displayed on the screen.

Figure 6:
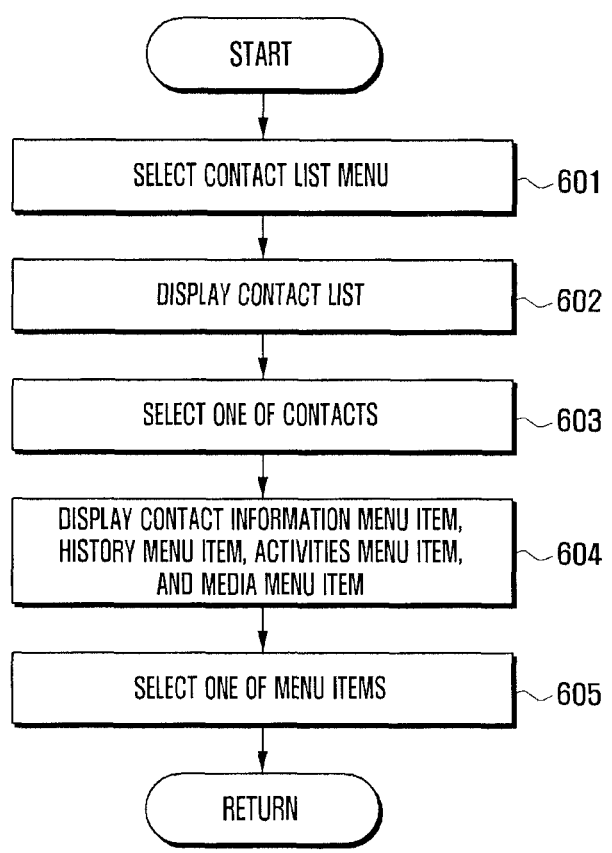
FIG. 6 is a flowchart illustrating detailed process of step 202 of the information provision method of FIG. 2.

FIG. 6 is a flowchart illustrating detailed steps of procedure 202 of the information provision method of FIG. 2.

Referring to FIG. 6, the controls unit 160 detects an input for selecting the contact list menu (106). The idle mode screen or home screen is provided with main menu icons including the icon representing the contact list menu. The user can execute the contact list menu by making a contact on the contact list menu icon.

Once the contact list menu is executed, the control unit 160 controls such that the contact list menu screen having the contact list is displayed by means of the display unit 150 (602). The contact list includes the contact items registered in the storage unit 130. If the user selects a contact item from the contact list by means of the input unit 140, the control unit 160 detects the input for selecting the contact item (603). Once the contact item selection input is detected, the control unit 160 controls such that the contact information menu item, history menu item, activities menu item, and media menu items are displayed by means of the display unit 150 (604).

When it is configured that the contact information menu item is selected automatically as default, the control unit 160 controls such that the aforementioned items are displayed with at least one information item corresponding to the selected contact item.

Next, the control unit 160 detects an input for selecting one of the contact information menu item, history menu item, activities menu item, and a media menu item (605).

Figure 7:
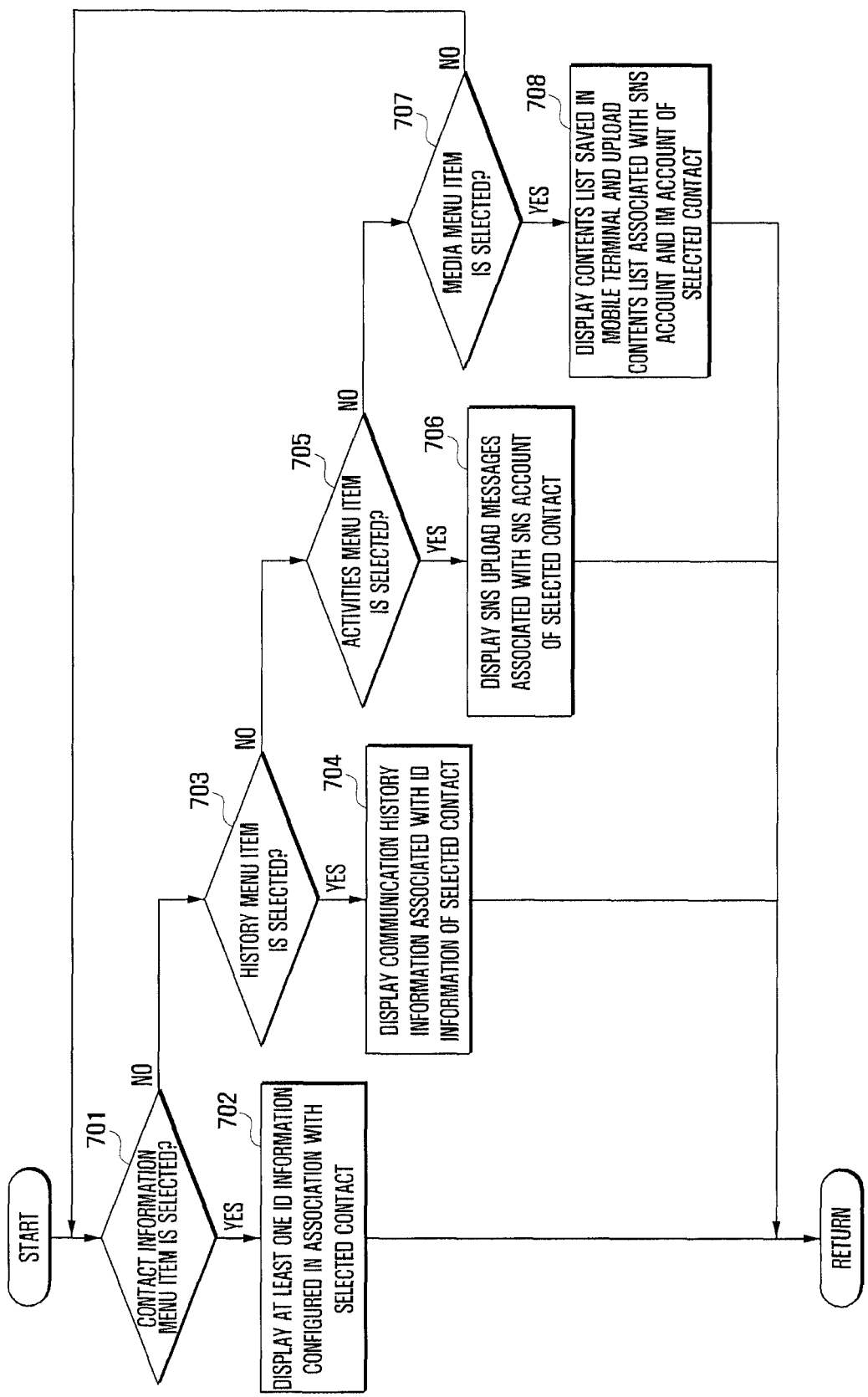
FIG. 7 is a flowchart illustrating detailed process of 203 of the information provision method of FIG. 2.

FIG. 7 is a flowchart illustrating detailed steps of procedure 203 of the information provision method of FIG. 2.

Referring to FIG. 7, the control unit 160 monitors to detect an input for selecting a menu item and, if a menu item is selected, determines whether the selected menu item is the contact information menu item (701). If the selected menu item is the contact information menu item, the control unit 160 controls such that at least one ID information item corresponding to the selected contact item is displayed by means of the display unit 150 (702). That is, the control unit 160 controls the display unit 150 to display the phone number, email account, and IM ID corresponding to the selected contact item. In the embodiment, if a plurality of contact items is linked to the selected contact item, the control unit 160 controls such that the contact items linked to the selected contact item are displayed in the form of a list by means of the display unit 150. The IM ID can be displayed with the presence state or location of the user. The presence information can be displayed in the form of a text or an image.

If the selected menu item is not the contact information menu item at step 701, the control unit 160 determines whether the selected menu item is the history menu item (703). If the selected menu item is the history menu item, the control unit 160 controls such that the ID and the communication history information items of the selected contact item by mean of the display unit 150 (704). In the embodiment, the communication history information items includes the incoming/outgoing call history, incoming/outgoing message history, incoming/outgoing email history, SNS message upload history, and IM history items. The communication history information items can be displayed along with the contents of the text message, email, and SMS upload message.

If the user selects one of the communication history information items, the control unit 160 executes the application for the corresponding communication service such that the application execution screen is displayed by means of the display unit 150. For example, if the incoming/outgoing message history item is selected, the control unit 160 executes the text messaging application and displays the application execution screen with the message inbox associated with the selected contact item.

If the selected menu item is not the history menu item at step 703, the control unit 160 determines whether the selected menu item is the activities menu item (705). If the selected menu item is the activities menu item, the control unit 160 controls such that the SNS upload message items related to the SNS account of the selected contact item by means of the display unit 150 (706). The activities menu is the menu representing the activity history of social network service related to the selected contact item. The activities menu screen is displayed along with the upload message of the selected contact item and the response messages of the upload message. The messages can be displayed along with the message upload time, comment entry menu item, and comment view menu item. In case that the selected contact item has a plurality of SNS accounts and the contact list associated with the selected contact item has the links to all of the SNS accounts, the activities menu screen is displayed along with the upload messages of the SNS accounts that are sorted in order of upload time.

If the user selects the comment entry menu item, the control unit 160 executes the corresponding SNS application to display the comment entry window by means of the display unit 150. If the user selects the comment via menu item, the control unit 160 executes the SNS application to display the comment list by means of the display unit 150.

If the selected menu item is not the activities menu item at step 705, the control unit 160 determines whether the selected menu item is the media menu item (707). If the selected menu item is the media menu item, the control unit 160 controls item is such that the contents list, SNS accounts of the selected contact item, and upload contents list associated with the IM ID stored in the mobile terminal 100 are displayed by means of the display unit 150. Here, the contents list stored in the mobile terminal 100 corresponds to the contents list registered in association with the selected contact item. If it is determined that the media menu item is selected, the control unit 160 accesses the servers managing the SNS accounts and IM IDs associated with the selected contact to receive the upload contents list and controls such that the items of the contents list are displayed in the form of thumbnail images by means of the display unit 150. The user can check all the contents associated with the contact selected with the media menu on a single menu screen.

Figure 8:
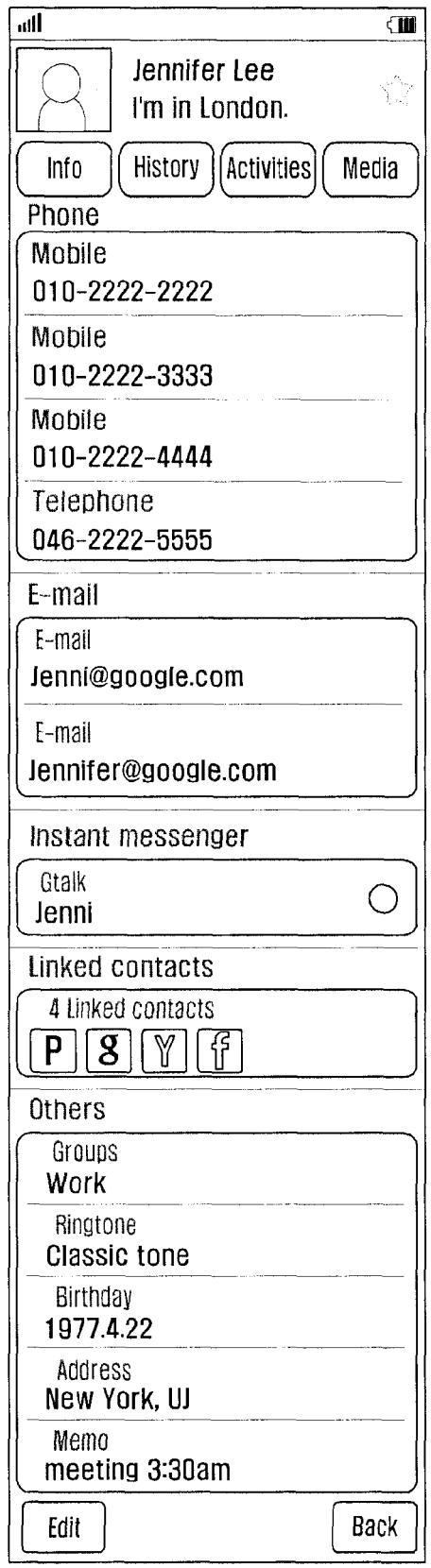
FIG. 8 is a diagram illustrating an exemplary screen image of the contact information menu screen displayed when the contact information menu item is selected from the contact list menu screen in the information provision method of FIG. 2.

FIG. 8 is a diagram illustrating an exemplary screen image of the contact information menu screen displayed when the contact information menu item is selected from the contact list menu screen in the information provision method of FIG. 2. In particular, FIG. 8 shows the stretched screen image scrolling across the screen such that the user can scroll the image across the screen to see the entire information.

As shown in FIG. 8, the contact information menu screen shows the photo and name (Jennifer Lee) of the contact item at the top of the screen along with the message "I'm in London" which is most recently uploaded as the presence state of the user corresponding to the selected contact item in the SNS. In case that the user represented by the selected contact item uploads his/her presence state in the corresponding SNS, the updated presence state is presented on the current screen. The upload interval can be selectively set by the user. The contact item screen has the contact information menu item, history menu item, activities menu item, and media menu item right below the photo and name section. In FIG. 8, the contact information menu item is shaded to indicate its selected state and, as a consequence, the ID information items of the Jennifer Lee are listed therebelow.

In the exemplary contact item screen of FIG. 8, the ID information items, for example, include the phone numbers "010-2222-2222", "010-2222-3333", "010-2222-4444", and "046-2222-5555"; email accounts "Jenni@google.com" and "Jennifer@google.com"; instant messenger (Gtalk) ID "Jenni"; linked contact items "p", "g", "y", and "f"; groups "Work"; ringtone "Classic tone", birthday "Apr. 22, 1997"; address "New York, Uj"; and memo "meeting 3:30 am".

The user can change the contact name of one of the linked contact items. Assuming that Jennifer Lee has the Google account named "Jenni", Yahoo account named "Jennifer", and Facebook account named "J. Lee"; it is possible to change the contact name for one of the Jenni, Jennifer, and J. Lee.

FIG. 9 is a diagram illustrating exemplary screen images corresponding to steps of the history menu-related process of the information provision method of FIG. 2.

Part [a] of FIG. 9 shows an exemplary screen image displayed when the history menu item is selected in the contact information menu screen. The screen image includes the communication history information items.

The Missed call item is presented with the time (10:00 AM) when the most recent missed call has occurred. The Sent SMS item represents the outbox of the SMS service, the Dialed call item represents the outgoing calls, and the Subject item represents the upload SNS messages. In case of the SMS and SNS, the content of the outgoing SMS message and uploaded SNS message are partially displayed as a part of the communication history information.

Part [b] of FIG. 9 shows an exemplary screen image displayed when the Subject item is selected from the screen image of part [a] of FIG. 9.

The exemplary screen image of part [b] of FIG. 9 shows the SNS application execution screen as a home screen of the contact item of Jennifer Lee. In the SNS application execution screen, the user can check the SNS message uploaded by Jennifer Lee and can upload a response by using the Reply menu.

The user can check the communication history with Jennifer Lee represented by the contact item with the history menu and execute the corresponding application by the action selecting one of the communication history items.

Figure 10:
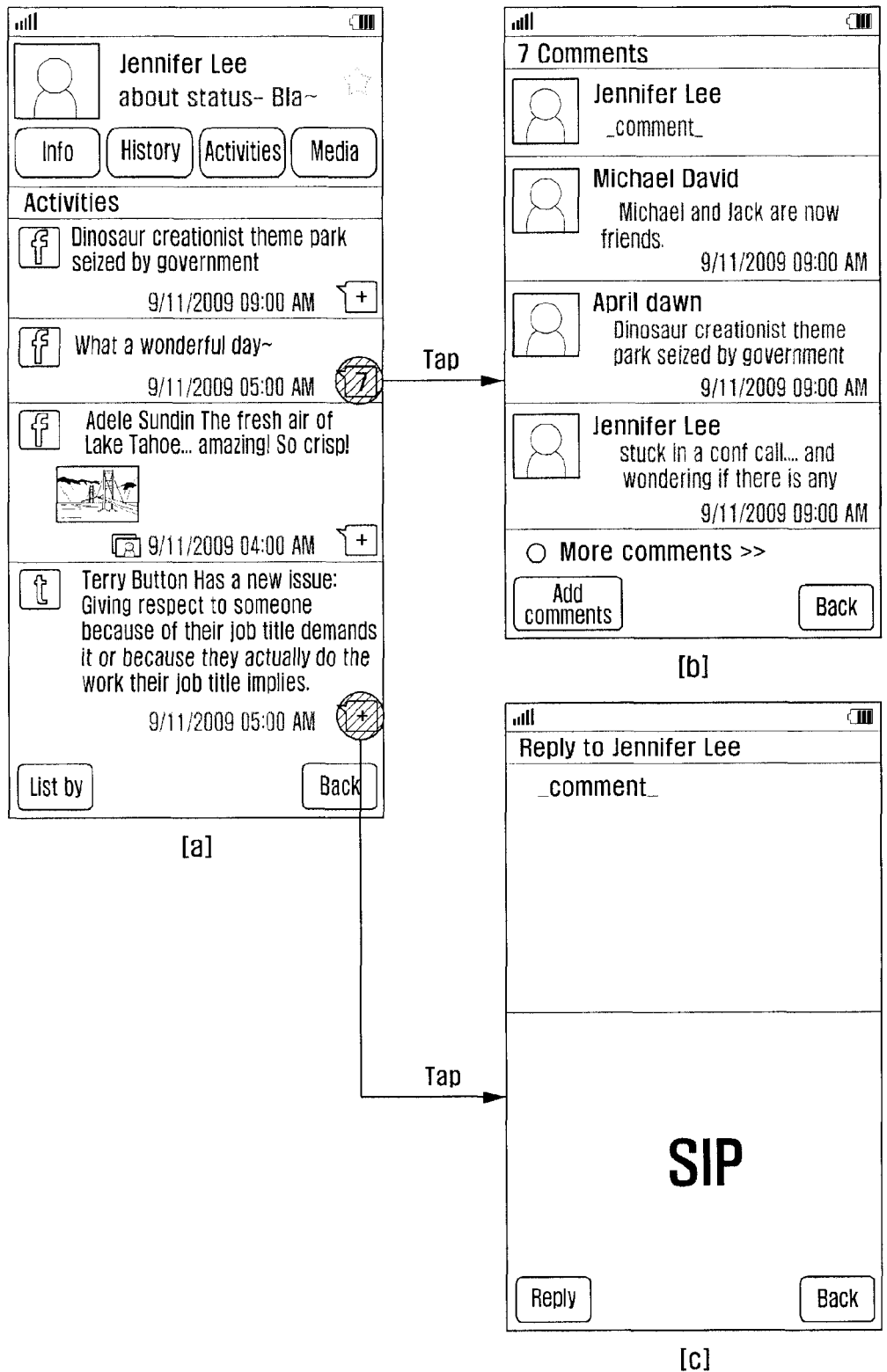
FIG. 10 is a diagram illustrating exemplary screen images corresponding to the activities menu-related process of the information provision method of FIG. 2.

FIG. 10 is a diagram illustrating exemplary screen images corresponding steps of the activities menu-related process of the information provision method of FIG. 2.

Part [a] of FIG. 10 shows an exemplary screen image displayed when the activities menu item is selected in the contact information menu screen. The screen image includes the SNS activity items.

The SNS activity items includes the SNS messages uploaded in association with all the SNS accounts linked to the contact item (Jennifer Lee). In part [a] of FIG. 10, the SNS messages uploaded to the two different SNS services represented by the text icons "f" and "t" are listed in order of upload time.

Part [b] of FIG. 10 shows an exemplary screen image displayed when the comment view icon of a specific SNS message item is selected from the screen image of part [a] of FIG. 10. In part [b] of FIG. 10, the four of the seven comments to the SNS message having the content of "What a wonderful day ~" are presented along with the "more comments" option and "add comment" menu item. If the "more comments" option is selected, the control unit 160 controls such that the rest three comments are presented. If the "add comment" menu item is selected, the control unit 160 controls such that a comment entry window is displayed.

Part [c] of FIG. 10 shows an exemplary image displayed when the "add comment" icon of a specific SNS message is selected from the screen image of part [a] of FIG. 10.

In part [c] of FIG. 10, a comment entry window is displayed such that, if the user writes a comment in the comment entry window, the comment is registered with the SNS message having the content of "Terry Button Has a new issue: ~".

Figure 11:
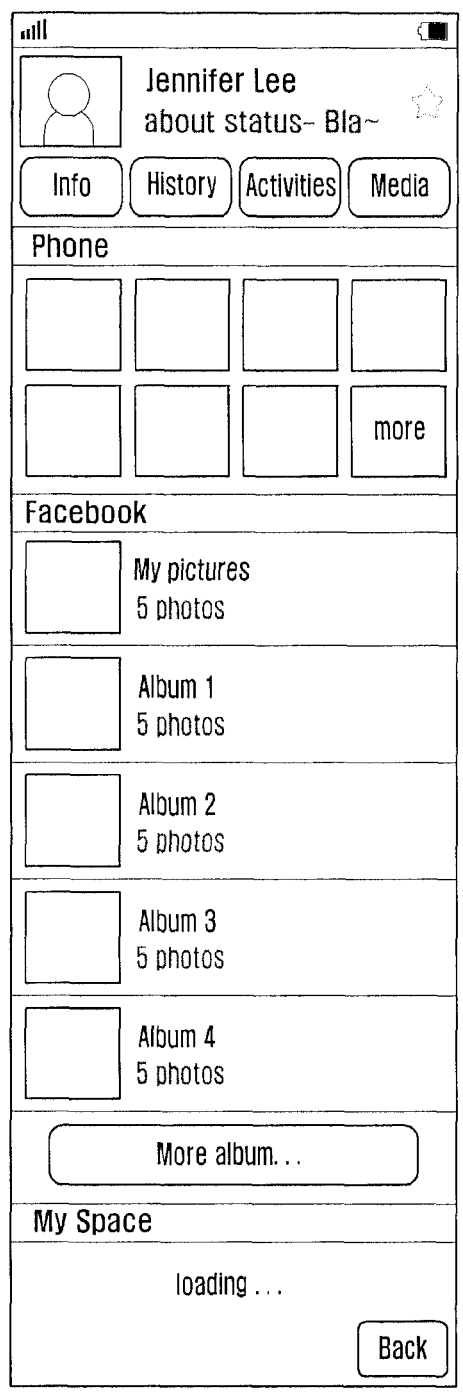
FIG. 11 is a diagram illustrating an exemplary screen image displayed when the media menu item is selected in the contact information menu screen of FIG. 8.

FIG. 11 is a diagram illustrating an exemplary screen image displayed when the media menu item is selected in the contact information menu screen of FIG. 8.

As shown in FIG. 11, if the media menu item is selected in the contact information menu screen, the control unit 160 controls such that the photos associated with the contact item (Jennifer Lee) that are stored in the storage unit 130 and uploaded to the SNS are displayed on the screen.

In FIG. 11, the photos stored in the storage unit 130 of the mobile terminal 100 in association with the contact item (Jennifer Lee) is entitled "Phone", the photos uploaded to the Facebook account of the contact item (Jennifer Lee) is entitled "Facebook", and the photos uploaded to the MySpace account of the contact item (Jennifer Lee) is entitled "My Space". The media menu screen provides the "more albums" key such that, if the user selects the "more album" key, more photos uploaded to the Facebook account are displayed. If the user selects one of the photos, the control unit 160 controls such that the original file of the selected photo is downloaded by means of the RF unit 110 and then displayed by means of the display unit 150.

According to an embodiment of the present invention, when a plurality of ID information items is registered to one contact item, the mobile terminal user can check all of the ID information items on the single menu screen and manage the communication information items associated with the individual ID information items in integrated manner.

Figure 12:
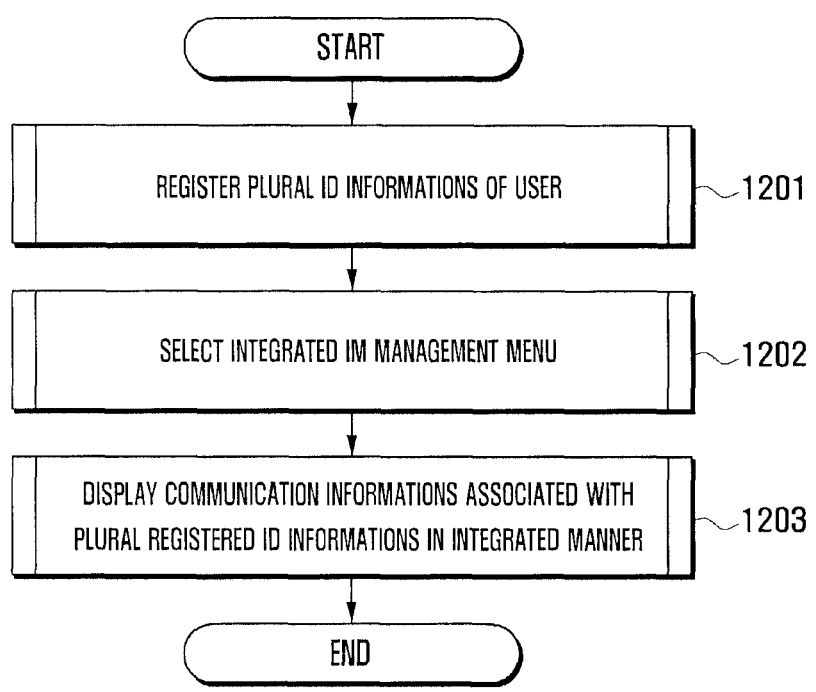
FIG. 12 is a flowchart illustrating an information provision method of a mobile terminal 100 according to another embodiment of the present invention.

FIG. 12 is a flowchart illustrating an information provision method of a mobile terminal 100 according to another embodiment of the present invention.

Referring to FIG. 12, the control unit 160 registers a plurality of ID information items of the mobile terminal user (1201). In an exemplary embodiment of the present invention, the ID information items include email account, SNS account, and IM ID. The control unit 160 can register the multiple ID information items of the mobile terminal user with a specific menu entitled "My account" and also register the email account of the mobile terminal user by using the email application and the SNS account of the mobile terminal user by using the SNS application. Detailed steps of procedure 1201 are described later with reference to FIG. 13.

Next, the control unit 160 monitors to detect a user input for selecting the integrated ID management menu (1202). The integrated ID management menu allows the mobile terminal user to manage and check the communication information items of the individual ID information items registered by the mobile terminal user. In the embodiment, the integrated ID management menu can be configured in the name of "Social Hub". The integrated ID management menu includes the SMS/MMS list, web account list, SNS list, and IM list. Detailed steps of procedure 1202 are described later with reference to FIG. 16.

Next, the control unit 160 controls such that the communication information items associated with individual ID information items registered at step 1201 are displayed by means of the control unit 160 in an integrated manner (1203). If the user selects one of the message (SMS/MMS) list items constituting the integrated ID management menu, web account item, SNS item, and IM item, the control unit 160 controls such that the communication items associated with the selected item is displayed by means of the display unit 150. Detailed steps of procedure 1203 are described later with reference to FIG. 17.

Figure 13:
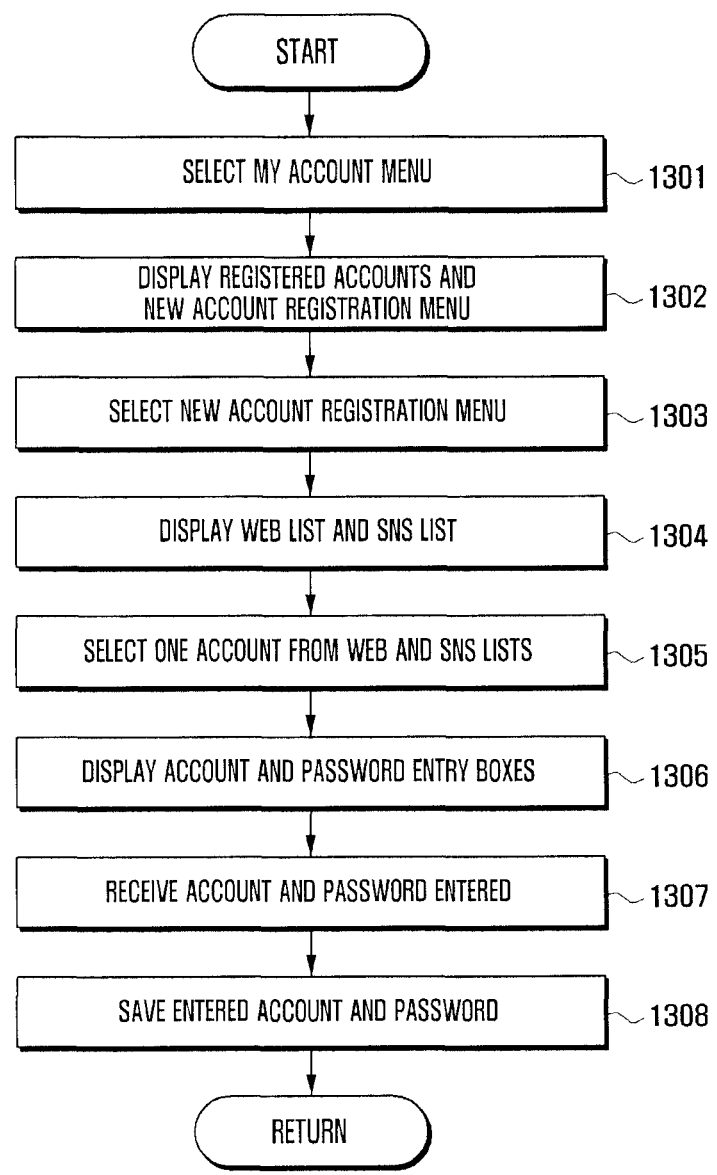
FIG. 13 is a flowchart illustrating detailed process of step 1201 of FIG. 13.

FIG. 13 is a flowchart illustrating detailed steps of procedure 1201 of FIG. 13. FIG. 13 shows the ID information item registration procedure of the information provision method for a mobile terminal according to an embodiment of the present invention, and the registration procedure can include the processes for registering the email account, SNS account, and IM ID of the mobile terminal user using the email application, SNS application, and IM application, respectively.

In the ID information item registration procedure, the control unit 160 monitors to detect an input for selecting the "my accounts" menu (1301). In the embodiment, the "my accounts" menu is one of the main menus and provided for the user to register the email account, SNS account, and IM ID.

If the "my accounts" menu selection input is detected, the control unit 160 controls such that a "my accounts" menu screen with the previously registered accounts and new account registration menu, is displayed by means of the display unit 150 (1302). At this time, the previously registered accounts can be provided in the form of list items, and the new account registration menu can be provided in the form of a menu item.

Next, the control unit 160 detects the input for selecting the new account registration menu (1303). If the new account registration menu selection input is detected, the control unit 160 controls such that a web list and an SNS list are displayed by means of the display unit 150 (1304). The web list is configured with the websites that are frequently used by people for email account services. The SNS list is configured with the SNSs that are frequently used by people.

Next, the control unit 160 detects the input for selecting a website or SNS from the web list and SNS list (1305). If a website or SNS is selected, the control unit 160 controls such that an account registration screen having a user name entry box and a password entry box (1306). Next, the control unit 160 detects the user name and password input by means of the input unit 140 (1307). If the user name and password input is detected, the control unit 160 saves the user name and password in the storage unit 130. At this time, the control unit 160 transmits the user name and password to a web server by means of the RF unit 110 to authenticate the user and, if the user is authenticated, saves the user name and password in the storage unit 130. The "my accounts" menu screen is updated with the newly registered account. Thereafter, if the "my accounts" menu is selected, the newly registered account appears in the account list.

According to an embodiment of the present invention, the contact list menu can include a "my profile" menu for managing the information on the mobile terminal user. The "my profile" menu includes the information fields of the photo, name, SNS presence, phone number, email account, and IM ID of the mobile terminal user. The "my profile" menu can include the menu items for editing and deleting the user information. If the "my profile" menu is selected, the control unit 160 controls such that the photo, name, SNS presence state, phone number, email account, and IM ID of the user are displayed by means of the display unit 150. The control unit 160 checks the current presence state of user which is set by the user and then controls such that, when the IM ID is displayed, the presence state of the user appears along with the IM ID. In an embodiment of the present invention, if the user selects the presence state registered to the SNS, the control unit 160 controls such that a list of the presence states of individual SNS accounts registered in the mobile terminal 100 and, if one of the presence states is selected, the presence state field of the "my profile" menu screen is changed for the selected presence state.

Figure 14:
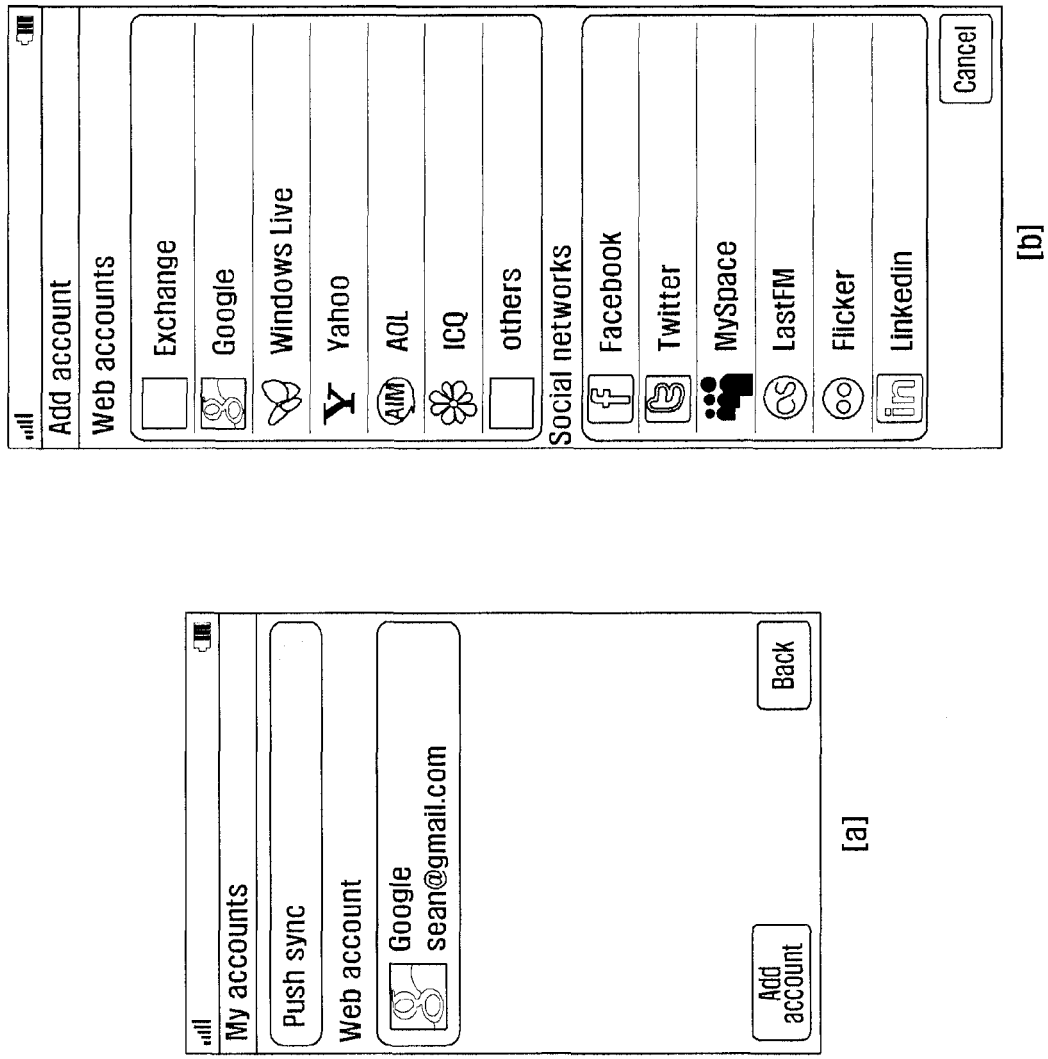
FIG. 14 is a diagram illustrating exemplary screen images corresponding to the ID information item registration procedure of FIG. 13.

FIG. 14 is a diagram illustrating exemplary screen images corresponding to steps of the ID information item registration procedure of FIG. 13.

Part [a] of FIG. 14 shows a "my accounts" screen displayed when the user selects the "my accounts" menu, and the "my accounts" screen includes the previously registered accounts (Google, sean@gmail.com) and the new account registration menu item (Add account). The "my accounts" screen of part [a] of FIG. 14 also can include a "push sync" menu for synchronization of the registered accounts (phonebook synchronization and calendar synchronization) and an "account priority" menu for configuring the priorities of the registered accounts.

Part [b] of FIG. 14 shows an "add account" screen displayed when the "add account" menu item is selected on the "my accounts" screen of part [a] of FIG. 14. The "add account" screen includes a web list and a SNS list. In part [b] of FIG. 14, the web list includes Google, Window Liver, Yahoo, AOL, and ICQ; and the SNS list includes Facebook, Twitter, MySpace, LastFM, Flicker, and Linkedin. The user can select one of the items of the web list and the SNS list.

Part [c] of FIG. 14 shows an account registration screen displayed when an item is selected from the web list and the SNS list. The account registration screen includes a user name entry box and a password entry box. The user enters the user name and password by means of the input unit 140 such that the user name and password is authenticated by a web server and then saved in the storage unit 130. The newly registered account is displayed in the "my accounts" screen.

Figure 15:
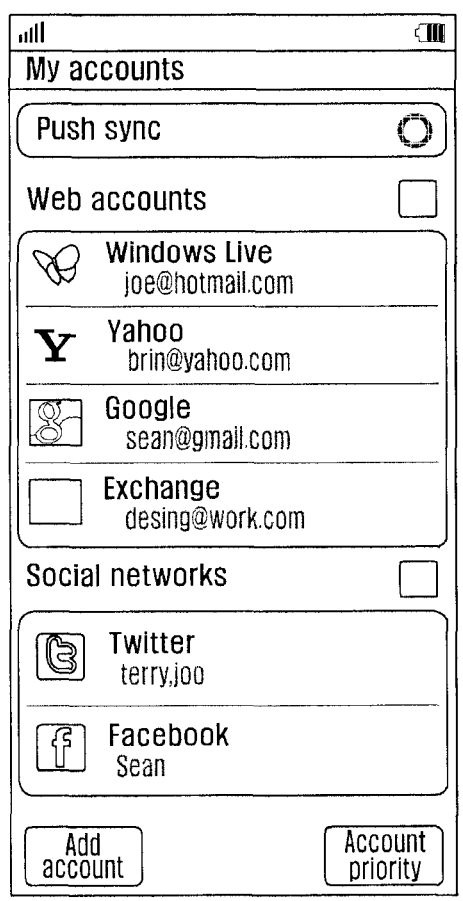
FIG. 15 is a diagram illustrating an exemplary "my accounts" screen having a plurality of accounts registered by the user through the account registration screen of part [c] of FIG. 14.

FIG. 15 is a diagram illustrating an exemplary "my accounts" screen having a plurality of accounts registered by the user through the account registration screen of part [c] of FIG. 14.

In FIG. 15, the "my accounts" screen includes a web account list having 4 web account items and a SNS account list having two SNS account items. joe@hotmail.com, brin@yahoo.com, sean@gmail.com, and desing@work.com are web accounts registered by the mobile terminal user, and terry.joo and Sean are the SNS accounts registered by the mobile terminal user. In the embodiment, a web account can be an email account or an IM ID. The mobile terminal user can registers and manages a plurality of accounts with the "my accounts" menu.

Figure 16:
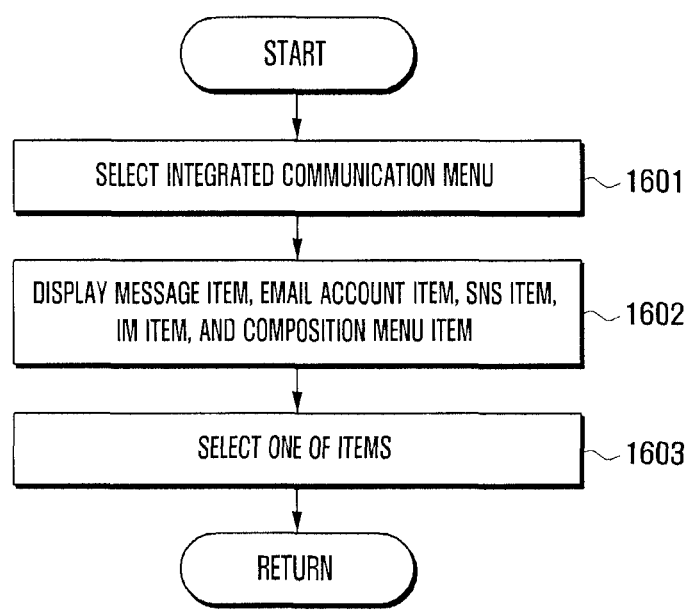
FIG. 16 is a flowchart illustrating detailed process of step 1202 of the information provision method of FIG. 12 according to an embodiment of the present invention.

FIG. 16 is a flowchart illustrating detailed steps of procedure 1202 of the information provision method of FIG. 12 according to an embodiment of the present invention.

Referring to FIG. 16, the control unit 160 detects an input for selecting the integrated communication menu (1601). The integrated communication menu is one of the main menus of the mobile terminal 100 and allows the user to manage the communication information items associated with the message, email, SNS, and IM identity information items in an integrated manner.

If the integrated communication menu selection input is detected, the control unit 160 controls such that the messaging service item, email account item, SNS item, IM item, and composition menu item are displayed by means of the display unit 150 (1602). The communication menu can include incoming/outgoing SMS item, incoming/outgoing MMS item, incoming/outgoing email item, SNS upload message check menu item, IM application execution menu item, SMS/MMS message composition menu item, email composition menu item, and SNS message composition menu item. Some representative menu items such as the message item, the email account item, the SNS item, the IM item, and the composition menu item can be displayed. Here, multiple email account items can be displayed.

The control unit 160 monitors to detect an input for selecting one of the items (1603). The user can select an item by making a touch to an item on the screen.

Figure 17:
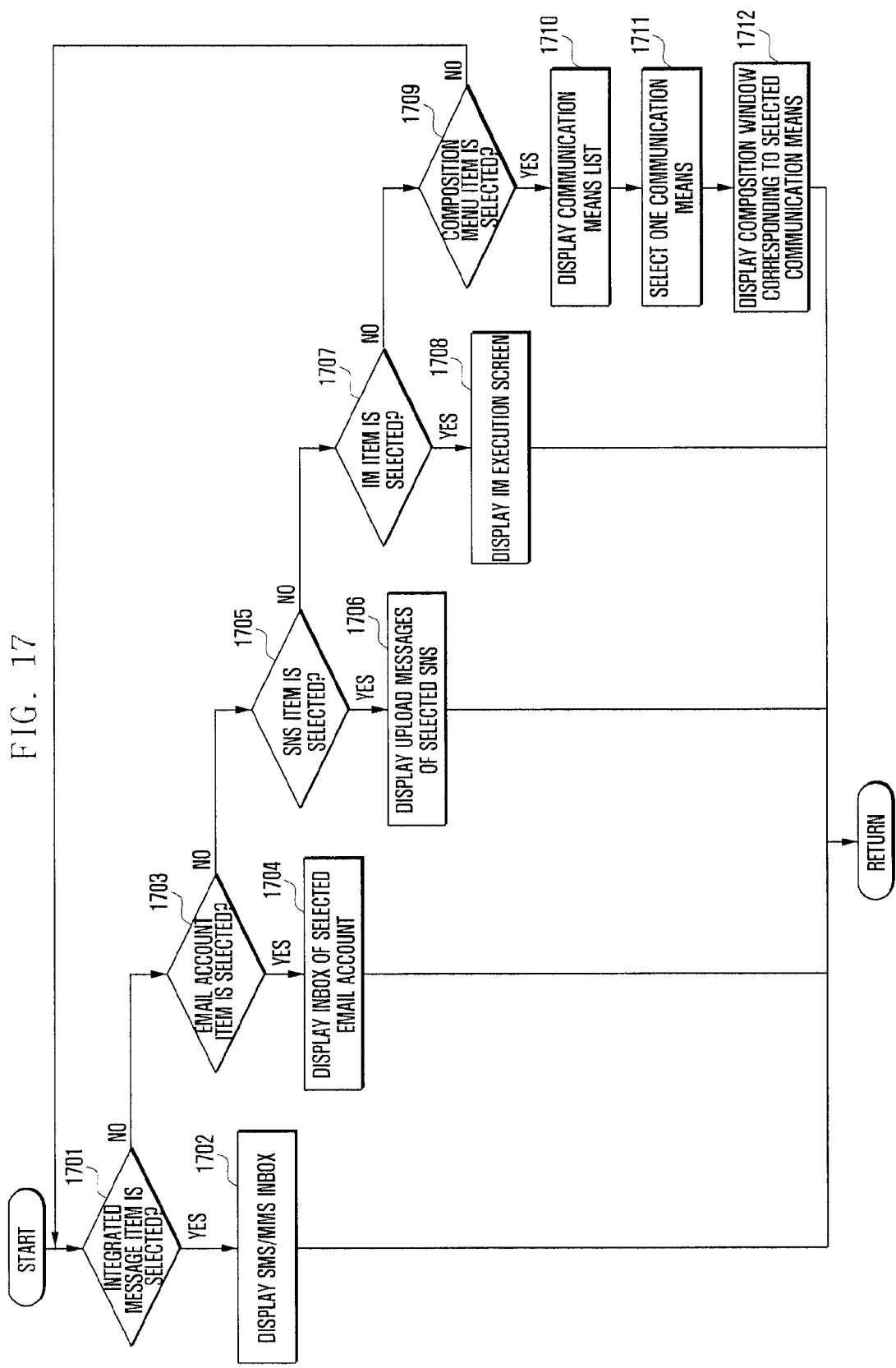
FIG. 17 is a flowchart illustrating detailed process of step 1203 of the information provision method of FIG. 12 according to an embodiment of the present invention.

FIG. 17 is a flowchart illustrating detailed steps of procedure 1203 of the information provision method of FIG. 12 according to an embodiment of the present invention.

The control unit 160 monitors to detect an input for selecting a menu item and, if a menu item is selected, determines whether the selected menu item is the integrated message item (1701). If the selected menu item is the integrated message item, the control unit 160 controls such that the SMS/MMS inboxes are displayed by means of the display unit 150 (1702).

If the selected menu item is not the integrated message item at step 1701, the control unit 160 determines whether the selected menu item is an email account item (1703). If the selected menu item is the email account item, the control unit 160 controls such that the inbox of the selected email account item is displayed by means of the display unit 150 (1704). In this case, the control unit 160 accesses a web server by means of the RF unit 110 to download the emails stored in the inbox of the selected email account and displays the downloaded emails by means of the display unit 150.

If the selected menu item is not the email account item at step 1703, the control unit 160 determines whether the selected menu item is an SNS item (1705). If the selected menu item is an SNS item, the control unit 160 controls such that the upload messages of the SNS account represented by the selected SNS item by means of the display unit 150 (1706). In this case, the control unit 160 accesses the SNS server by means of the RF unit (110) to download the SNS messages uploaded to the selected SNS and displays the downloaded SNS messages by means of the display unit 150.

If the selected menu item is not an SNS item at step 1705, the control unit 160 determines whether the selected menu item is an IM item (1707). If the selected menu item is an IM item, the control unit 160 controls such that the IM execution screen is displayed by means of the display unit 150 (1708). In this case, the mobile terminal maintains its log-in state to the IM server and, when an IM item is selected, the control unit 160 displays the IM execution screen having the IM buddy list or a chatting window by means of the display unit 150.

If the selected menu item is not an IM item at step 1707, the control unit 160 determines whether the selected menu item is the composition menu item (1709). If so, the control unit 160 controls such that a communication means list is shown by the display unit 150 (1710). In an embodiment of the present invention, the communication means list includes the message item, email account item, and SNS item. If an input for selecting a communication means from the communication means list is detected (1711), the control unit 160 controls such that the composition window of the selected communication means is displayed by means of the display unit 150 (1712). For example, when an email account item is selected, the control unit 160 controls such that the email composition window having the selected email account as the sender address is displayed by means of the display unit 150.

FIG. 18 is a diagram illustrating exemplary screen images corresponding to steps of the communication menu item-related process of the information provision method of FIG. 16.

Part [a] of FIG. 18 shows an exemplary home screen image having an integrated communication menu icon entitled "Social Hub". The number "20" presented at the top right corner of Social Hub icon indicates the total number of the SMS/MMS, email, and SNS upload messages that are not checked by the user. That is, the control unit 160 controls such that the integrated communication menu icon is displayed along with the number of communication information items that are not checked yet by the user. If the user makes a touch to the Social Hub icon on the screen, the control unit 150 controls such that the integrated communication menu screen is displayed by means of the display unit 150.

Part [b] of FIG. 18 shows an exemplary integrated communication menu screen. The integrated communication menu screen includes at least one of messaging service account items, web account items, email account items, and IM account items.

The integrated communication menu screen includes a composition menu item entitled "Compose". The item entitled "Messages" indicates the messaging service account item; the items entitled "Google (Jegarry@gmail . . .)", "Google (yun@gmail.com . . .), and "Yahoo (yun@yahoo . . .)" indicate web account items, the items entitled "Facebook" and "MySpace" indicate SNS account items. Each of the Google and Yahoo web account items are provided with an envelope icon representing email service and a text balloon icon representing IM service. Each of the icons representing the messaging service, email service, and SNS is provided with the number of messages that are not checked yet by the user. The text balloon icon can be displayed along with the number of ongoing chatting windows. The user can select one of the service account items in the integrated communication menu screen to check the messages of the SMS/MMS, email, or SNS account, or compose a new message of the corresponding service account.

FIG. 19 is a diagram illustrating exemplary screen images displayed in series when the messaging service account item is selected in the message checking process of the information provision method of FIG. 16.

Part [a] of FIG. 19 shows the integrated communication menu screen on which the messaging service account item entitled "Messages" is selected, and part [b] of FIG. 19 shows an exemplary service account screen image displayed when the messaging service account item representing SMS/MMS service is selected.

FIG. 20 is a diagram illustrating exemplary screen images displayed in series when a web account item is selected in the message checking process of the information provision method of FIG. 16.

Part [a] of FIG. 20 shows the integrated communication menu screen on which a web account item entitled "Google (jegarry@gmail . . .)" is selected, and part [b] of FIG. 20 shows an exemplary web account screen image displayed when the web account item entitled "Google (jegarry@gmail . . .) is selected. In case of part [b] of FIG. 20, the web account screen is displayed in the state where the inbox item is selected such that the inbox message items contained in the Inbox are presented. The web account screen is provided with the mailbox items entitled "Inbox", "Sentbox", and "Outbox" respectively such that, when the user selects one of the mail box items, the messages contained in the mail box represented by the selected item are displayed.

FIG. 21 is a diagram illustrating exemplary screen images displayed in series when an SNS account item is selected in the message checking process of the information provision method of FIG. 16.

Part [a] of FIG. 21 shows the integrated communication menu screen on which the envelope icon provided with an SNS account item entitled "Facebook" is selected, and part [b] of FIG. 21 shows an exemplary SNS account screen image displayed when the envelope icon of the SNS account item entitled "Facebook" is selected. In case of part [b] of FIG. 21, the SNS account screen is displayed in the state where the inbox item is selected such that the inbox message items contained the inbox are presented. If the message box item entitled "Sent" is selected, the SNS account screen is displayed in the state where the sent message items contained in the message box entitled "Sent" is presented on the screen.

If the user selects the SNS account item entitled "Facebook" itself in the screen of part [a] of FIG. 21, the control unit 160 executes the Facebook application with the application execution screen having the SNS messages uploaded in association with the user.

Figure 22:
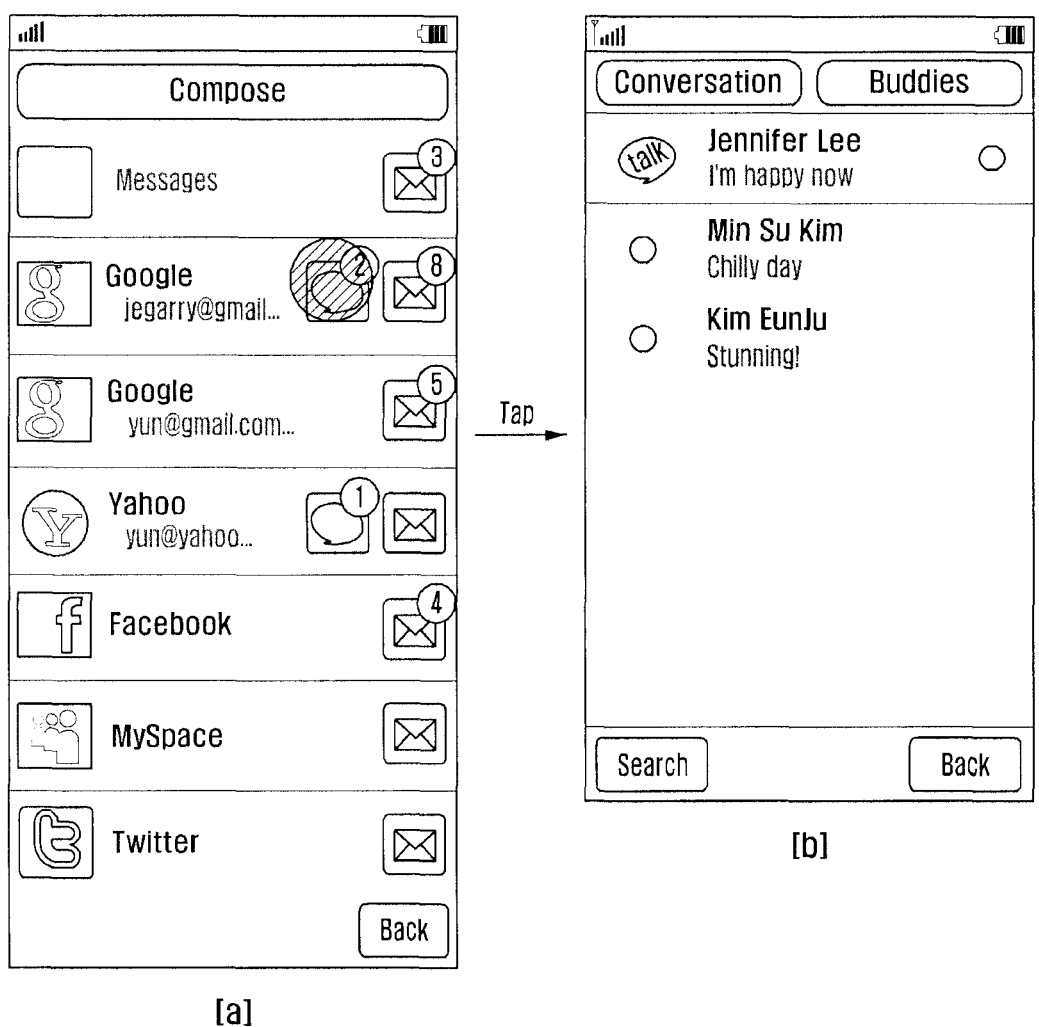
FIG. 22 is a diagram illustrating exemplary screen images displayed in series when an IM service item is selected in the message checking process of the information provision method of FIG. 16.

FIG. 22 is a diagram illustrating exemplary screen images displayed in series when an IM service item is selected in the message checking process of the information provision method of FIG. 16.

Part [a] of FIG. 22 shows the integrated communication menu screen on which the text balloon icon provided with the web account item entitled "Google (jegarry@gmail . . .)" is selected, and part [b] of FIG. 22 shows an exemplary IM service account screen image displayed when the text balloon icon of the web account item entitled "Google (jegarry@gmail . . .)" is selected. As shown in part [b] of FIG. 22, the user can execute the IM application with the action for checking the email in the integrated communication menu entitled "Social Hub".

FIG. 23 is a diagram illustrating exemplary screen images displayed in series when the composition menu item is selected in the message checking process of the information provision method of FIG. 16.

Part [a] of FIG. 23 shows the integrated communication menu screen on which the composition menu item is selected, and part [b] of FIG. 23 shows an exemplary account list window displayed when the composition menu item is selected. In case of part [b] of FIG. 23, the account list window shows an SMS/MMS account entitled "Messages"; email accounts entitled "jegarry@gmail.com", "yun@gmail.com", and "yun@yahoo.com"; and SNS accounts entitled "Facebook" and "Twitter". If the user selects "Messages" item representing the SMS/MMS account, the control unit 160 controls such that the SMS/MMS message composition window is displayed. Also, if the user selects one of the "jegarry@gmail.com", "yun@gmail.com", and "yun@yahoo.com" items, the control unit 160 controls such that the email composition window is displayed. Also, if the user selects one of the "Facebook" and "Twitter" items, the control unit 160 controls such that the SNS message composition window is displayed. Accordingly, the user can execute the corresponding application for writing a message or an email in the integrated communication menu without cumbersome steps for searching for the application such as messaging, email, and SNS applications.

Figure 24:
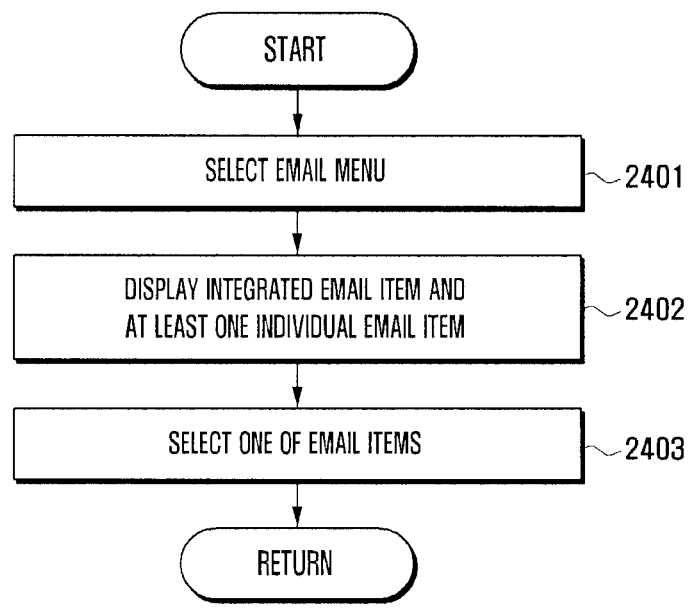
FIG. 24 is a flowchart illustrating detailed process of step 1202 of the information provision method of FIG. 12 according to another embodiment of the present invention.

FIG. 24 is a flowchart illustrating detailed steps of procedure 1202 of the information provision method of FIG. 12 according to another embodiment of the present invention.

Referring back to FIG. 16, the control unit 160 detects an input for selecting an email menu (2401). In an embodiment of the present invention, the email menu is one of the main menus of the mobile terminal and allows the user to manage and check the email accounts and inboxes in an integrated manner.

If the email menu selection input is detected, the control unit 160 controls such that an integrated email item with at least one email item (2402). The integrated email item is the menu item for displaying the individual email items of all the email accounts registered in the mobile terminal 100, and the email items represent the emails of the individual email accounts. In an embodiment of the present invention, the control unit 160 controls such that the individual email items are displayed along with tags having different shape and color.

The control unit 160 monitors to detect an input for selecting one of the items (2403). The user can select an item by making a touch to an item on the screen.

In an embodiment of the present invention, the email menu includes an email account configuration menu item, and the email account configuration menu screen includes a list of web accounts registered in the mobile terminal 100. If one of the web accounts is selected by the user on the email account configuration menu screen, the control unit 160 controls such that the synchronization menu item and IM execution menu item associated with the selected web account by mean of the display unit 150. The synchronization menu screen can include an email synchronization menu item, a calendar synchronization menu item, and a contact synchronization menu item. Each of the synchronization menu items can be provided with a synchronization interval setting menu such that the user can set the synchronization intervals of the email, calendar, and contact items and save the settings in the storage unit 130 under the control of the control unit 160. The control unit 160 operates timers for determining the synchronization such that, when the synchronization time arrives, the controls accesses the web server by means of the RF unit 110 to download the updates of the email, calendar, and contact information and saves the updated information.

Figure 25:
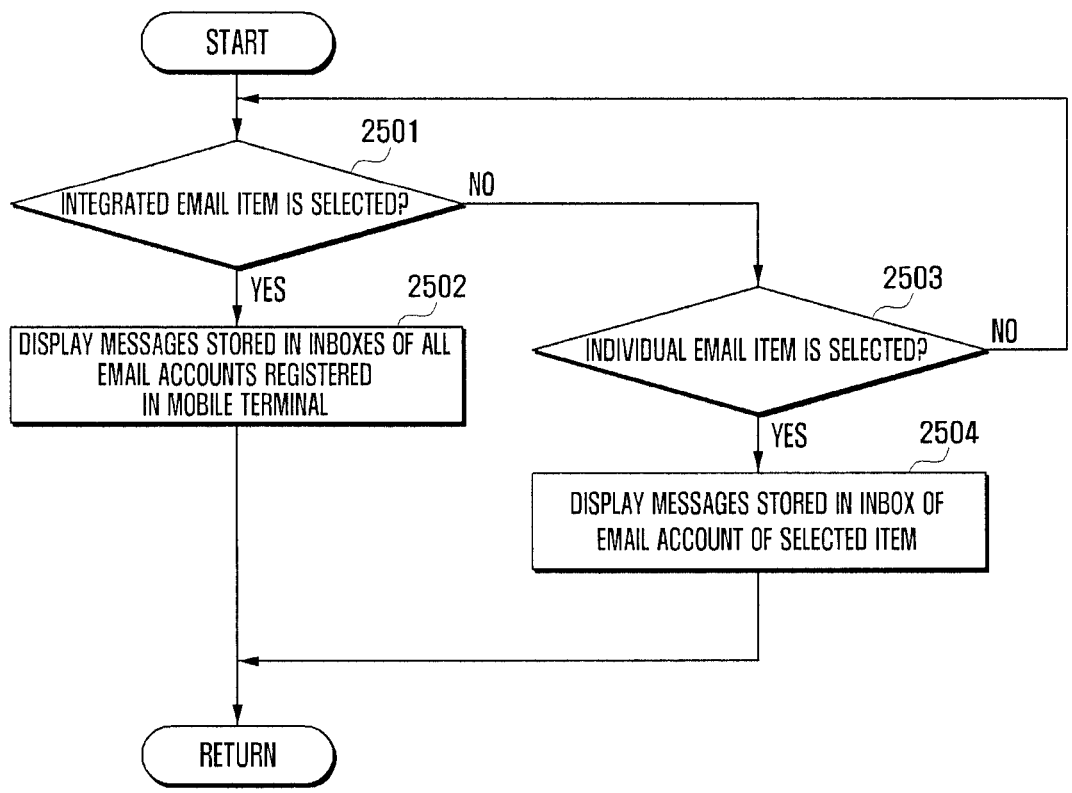
FIG. 25 is a flowchart illustrating detailed process of step 1203 of FIG. 12 according to another embodiment of the present invention.

FIG. 25 is a flowchart illustrating detailed steps of procedure 1203 of FIG. 12 according to another embodiment of the present invention.

The control unit 160 monitors to detect an input for selecting a menu item and, if a menu item is selected, determines whether the selected menu item is the integrated email item (2501). If so, the control unit 160 controls such that all the emails contained in the inboxes of the email accounts registered in the mobile terminal 100 by means of the display unit 150 (2502). For example, if two email accounts are registered in the mobile terminal 100, the control unit 160 controls such that the emails received with the two email accounts are displayed in order of received times. Here, the emails of the different email accounts can be displayed with tags having different colors or shapes for the discrimination purpose. That is, the emails of one email account are itemized with tag A, while the emails of the other account are itemized with tag B.

If the selected menu item is not the integrated email item, the control unit 160 determines whether the selected menu item is an individual email item (2503). If the selected menu item is an individual email item, the control unit 160 controls such that the emails contained in the inbox of the email account to which the individual email item belongs (2504). That is, if it is determined that the selected email item belongs to a first email account, the control unit 160 controls such that the emails contained in the inbox of the first email account are displayed in the itemized form. Otherwise, if it is determined that the selected email item belongs to a second email account, the control unit 160 controls such that the emails contained in the inbox of the second email account are displayed in the itemized form.

Figure 26:
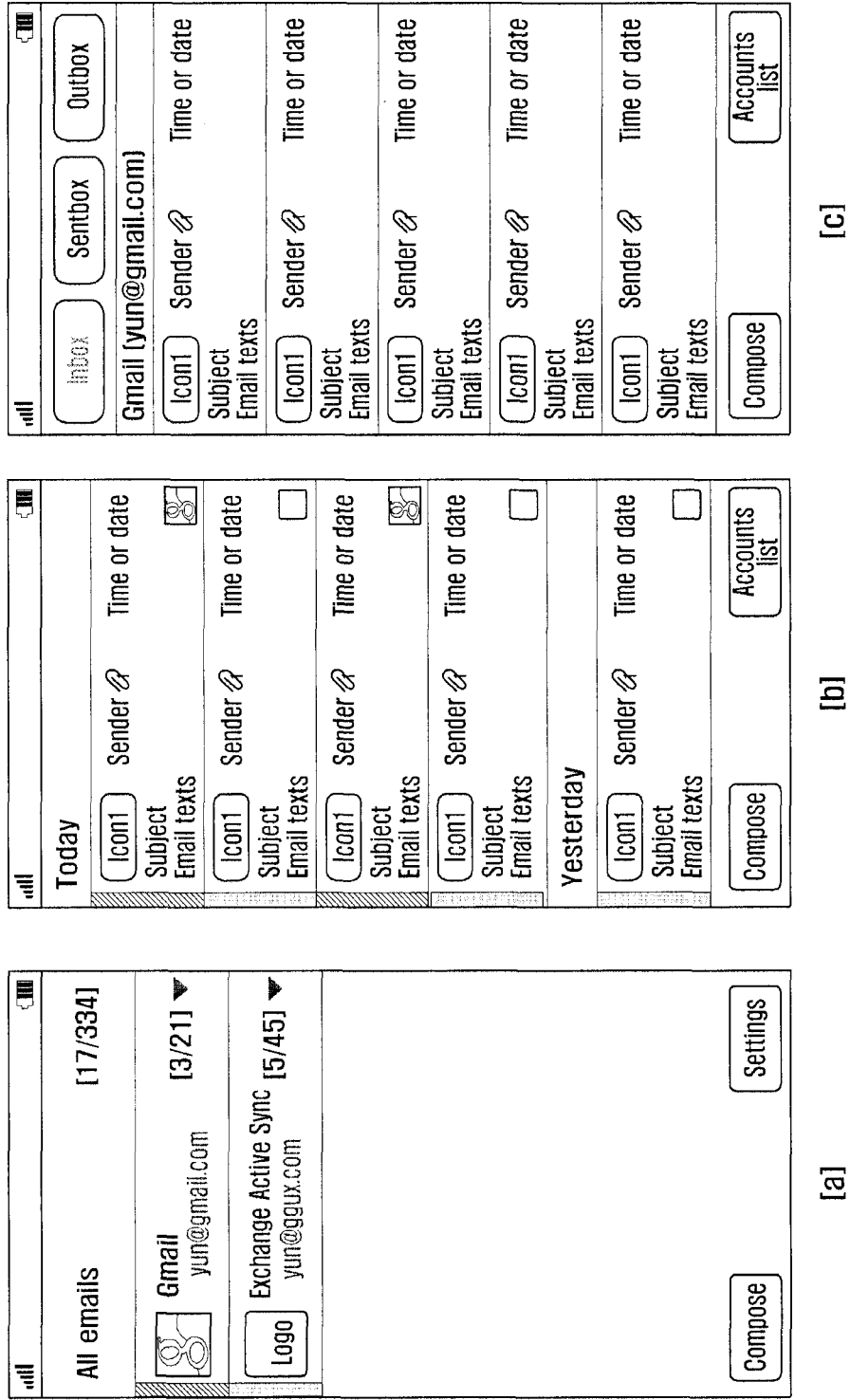
FIG. 26 is a diagram illustrating exemplary screen images corresponding to the email menu item-related process of the information provision method of FIG. 16.

FIG. 26 is a diagram illustrating exemplary screen images corresponding to steps of the email menu item-related process of the information provision method of FIG. 16.

Part [a] of FIG. 26 shows an exemplary email menu screen displayed when the email menu item is selected in the home screen (see FIG. 18). In part [a] of FIG. 26, the email menu screen includes two email account items under the integrated email menu entitled "All emails". The two email account items represent a "Gmail" account and an "Exchange Active Sync" account, respectively. The two email accounts are itemized with respective tags having different pattern for the discrimination purpose, each tag being attached at the left end of the corresponding email account item.

Part [b] of FIG. 26 shows an exemplary integrated email accounts screen displayed when the integrate email menu entitled "All emails" is selected in the email menu screen of part [a] of FIG. 26. In part [b] of FIG. 26, the integrated email screen shows all the emails contained in the inboxes of both the Gmail and Exchange Active Sync accounts in order of received times. As shown in part [a] of FIG. 26, each email item has the tag at the left end such that the user can identify the email account in which the email is received.

Part [c] of FIG. 26 shows an exemplary individual email account screen displayed when one of the email items is selected in the email menu screen of part [a] of FIG. 26. In part [c] of FIG. 26, the emails contained in the inbox of the Gmail account are itemized. The individual email account screen displays the emails items without discrimination tags, as compared to the integrated email accounts screen, but with a Sentbox and Outbox items.

Figure 27:
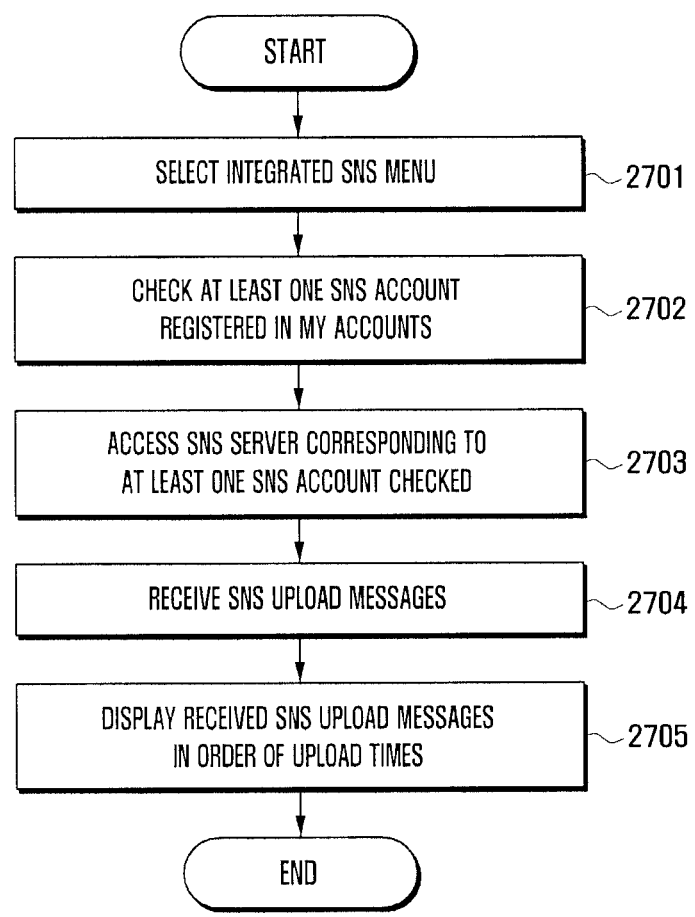
FIG. 27 is a flowchart illustrating an information provision method for a mobile terminal according to an embodiment of the present invention.

FIG. 27 is a flowchart illustrating an information provision method for a mobile terminal according to an embodiment of the present invention. The description is made with reference to FIG. 27 under the assumption that a plurality of SNS accounts is registered in the mobile terminal 100.

The control unit 160 monitors to detect an input for selecting an integrated SNS menu (2701). In an embodiment of the present invention, the integrated SNS menu allows the user to manage and check the communication information items associated with the SNS accounts of the mobile terminal user.

If the integrated SNS menu selection input is detected, the control unit 160 checks at least one SNS account registered as one of "my accounts" (2702). That is, the control unit 160 checks all the SNS accounts registered in the mobile terminal 100 by the user.

If at least one SNS account is detected, the control unit 160 accesses the SNS server managing the detected SNS account (2703) and downloads the SNS upload messages (2704). In case that two SNS accounts are registered in the mobile terminal 100, the control unit 160 accesses the two SNS servers corresponding to the individual SNS accounts to received the SNS upload messages.

Next, the control unit 160 controls such that the downloaded SNS upload messages are displayed in order of upload times by means of the display unit 150 (2705). That is, the control unit 160 displays the upload messages of the different SNS accounts in order of upload times on the screen in an integrated manner. At this time, the SNS upload messages are displayed in the form of a list along with a comment entry menu item and a message composition menu item. The user can enter a comment to a specific upload message with the comment input menu item and post a new upload message with the message composition menu item. Once a new message is composed by the user, the control unit 160 accesses the SNS servers corresponding to the individual SNS accounts registered in the mobile terminal 100 to upload the newly composed message.

Figure 28:
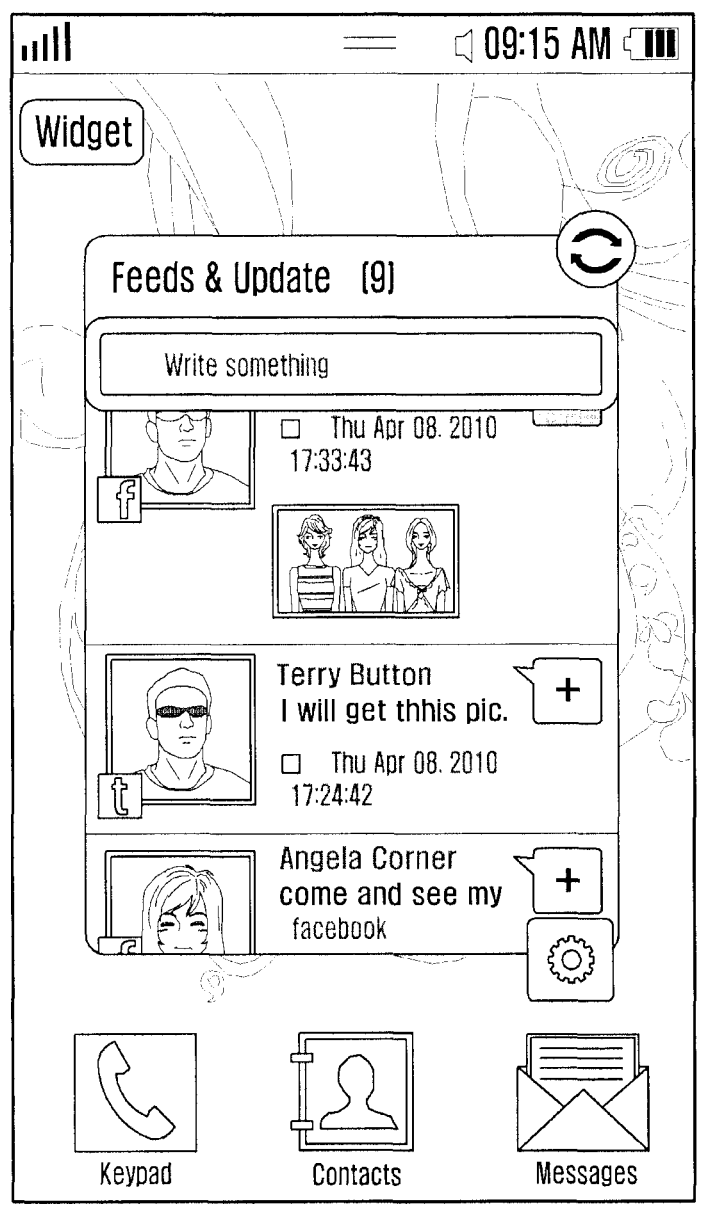
FIG. 28 is a diagram illustrating an exemplary integrated SNS menu screen for an information provision method according to an embodiment of the present invention.

FIG. 28 is a diagram illustrating an exemplary integrated SNS menu screen for an information provision method according to an embodiment of the present invention.

The integrated SNS menu screen is provided in the form of a widget floating on the home screen. The integrated SNS menu screen is entitled "Feeds & Update" along with the number of new upload messages (e.g., 9). In FIG. 28, the upload messages of the two SNS message accounts represented respectively by "f" and "t" are displayed in order of upload times in an integrated manner. The integrated SNS message menu screen includes the message composition item entitled "Write something", and each upload message is provided with a text balloon icon marked with a plus (+) symbol. Once a message is written with the message composition menu item, the message is uploaded to the two SNS servers of the "f" and "t" accounts.

FIG. 29 is a diagram illustrating exemplary screen images provided for an information provision method according to another embodiment of the present invention. In particular, FIG. 29 shows an exemplary case when the integrated IM menu is selected. In an embodiment of the preset invention, the integrated IM menu allows the user to manage the IM account IDs of the user in an integrated manner and update the presence state of the user in real time and provides a chatting environment.

Part [a] of FIG. 29 shows the home screen or the background screen in the state where the integrated IM menu icon is selected, and part [b] of FIG. 29 shows the integrated IM menu screen displayed when the user makes a touch to the integrated IM menu icon on the integrated IM menu screen.

If an input for selecting the integrated IM menu icon is detected, the control unit 160 controls such that the IM accounts are displayed by means of the display unit 150. At this time, the control unit 160 checks the user's IM IDs registered in the mobile terminal and displays and displays the IM account items with respective IM IDs. The control unit 160 controls such that the IM IDs are displayed along with the presence state. In an embodiment of the present invention, the mobile terminal 100 can configured to stay in the login state to an IM service, and the presence of the user can be set by the user. In part [b] of FIG. 29, the integrated IM menu screen includes the IM accounts (Messenger, Yahoo! Messenger, Google Talk, AIM, and ICQ), and the Messenger, Yahoo! Messenger, Google Talk are presented along with corresponding IM IDs (whale@hotmail.com, Matrix@ymail.com, and Jennifer Lee@gmail.com). Each IM account item is presented with a presence indication icon at the right end.

If one of the IM account items is selected from the IM account list, the control unit 160 determines whether the selected IM account has the registered IM ID and, if it has, controls such that the IM execution screen is displayed by means of the display unit 150. If the selected IM account has no registered IM ID, the control unit 160 controls such that the IM ID registration menu item is displayed by means of the display unit 150. The IM ID registration menu screen includes and IM ID and password entry boxes.

Part [c] of FIG. 29 shows an exemplary individual IM menu screen displayed when the user selects the IM account item, e.g. Google Talk, in the integrated IM menu screen. In part [c] of FIG. 29, a list of the friends of Jennifer Lee is displayed. Part [d] of FIG. 29 shows an exemplary chatting screen displayed when the user selects one of the friends in the friend list of part [c] of FIG. 29.

The user can manage the IM IDs registered in the mobile terminal 100, updates the presence state of each IM service account in real time, and enter the chatting environment immediately, using the integrated IM menu.

Figure 30:
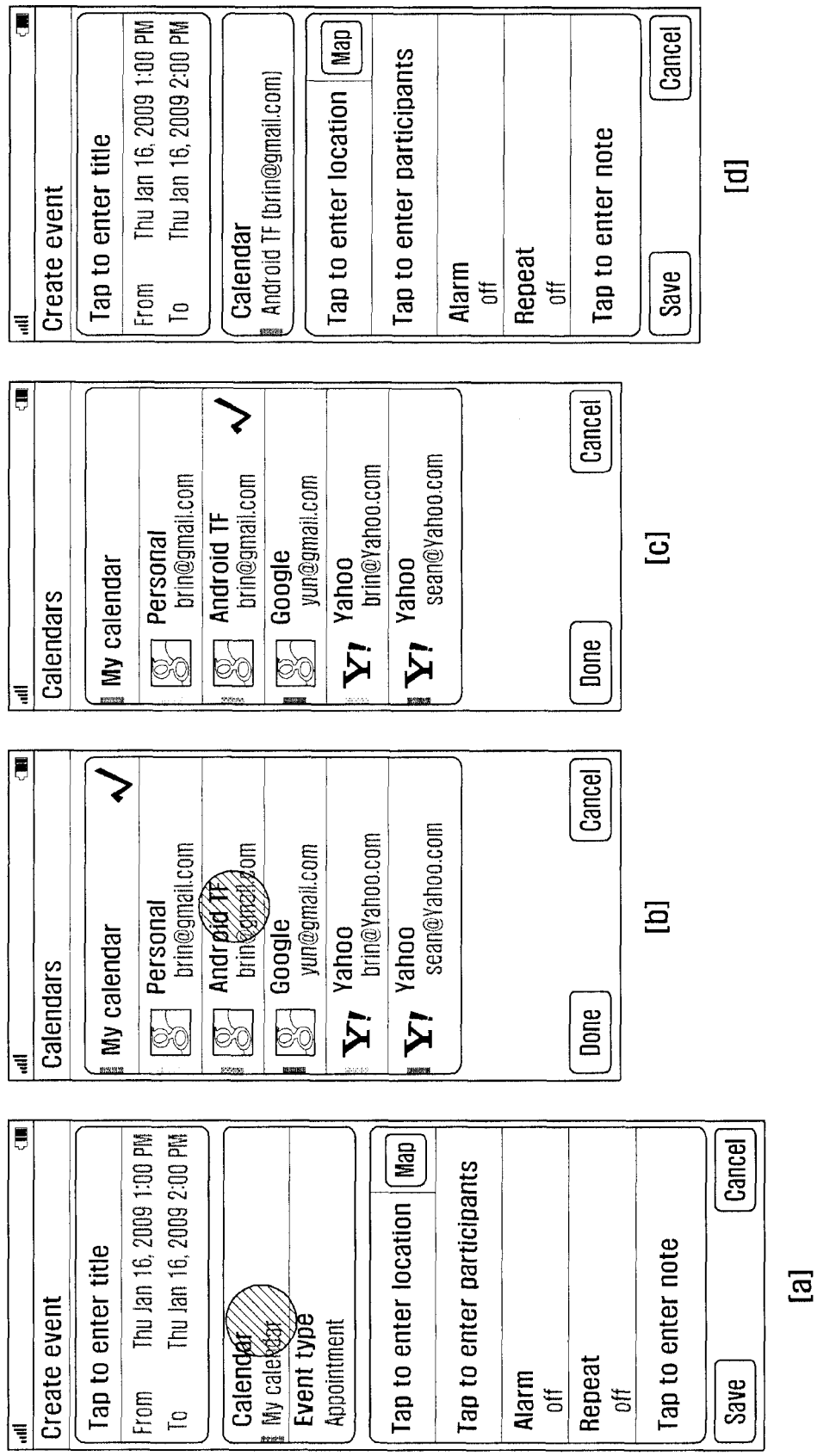
FIG. 30 is a diagram illustrating exemplary screen images provided for an information provision method according to another embodiment of the present invention.

FIG. 30 is a diagram illustrating exemplary screen images provided for an information provision method according to another embodiment of the present invention. FIG. 30 shows an exemplary case where the user creates an event in the calendar menu.

Part [a] of FIG. 30 shows an event creation menu screen displayed when an event creation item is selected in the calendar menu screen. The event creation menu screen includes the menu items such as event title, time, location, alarm, and event participant. In an embodiment of the present invention, the event creation menu screen includes a calendar selection menu item.

If an input for selecting the calendar menu item is detected by means of the input unit 140, the control unit 160 controls such that a list of web accounts supporting the calendar service among the web accounts registered in the mobile terminal by means of the display unit 150. Part [b] of FIG. 30 shows an exemplary calendar account list screen displayed when the calendar menu item is selected in the event creation menu screen of part [a] of FIG. 30. The calendar account list screen shows the list of web accounts supporting calendar service in the form of built-in calendars of the mobile terminal 100.

Part [c] of FIG. 30 shows an exemplary calendar account menu screen displayed when a web account is selected on the calendar account list screen of part [b] of FIG. 30. In part [b] of FIG. 30, a web account is marked to indicate that the web account is selected by the user.

If an input for finishing the process, the control unit 160 controls such that the event creation menu screen appears again along with the name of the calendar selected in the calendar selection menu. Part [d] of FIG. 30 shows an exemplary calendar creation screen displayed when the user selects a calendar account in the calendar account menu screen of part [c] of FIG. 30. The calendar creation screen shows the name of the calendar selected by the user, e.g. Android TF (brin@gmail.com).

The user can select a calendar to which an event is added and can configure such that the web calendar function and the terminal's calendar function interoperate with each other through the calendar menu.

According to an embodiment of the present invention, if the user selects an event participation menu item, the control unit 160 controls such that a contact list is displayed by means of the display unit 150. Sequentially, if the user selects at least one contact item from the contact list, the control unit 160 controls such that the selected contact item is added as the event participant. Here, the event creation menu screen can be displayed along with the event participant menu item having the contact item selected by the user.

Figure 31:
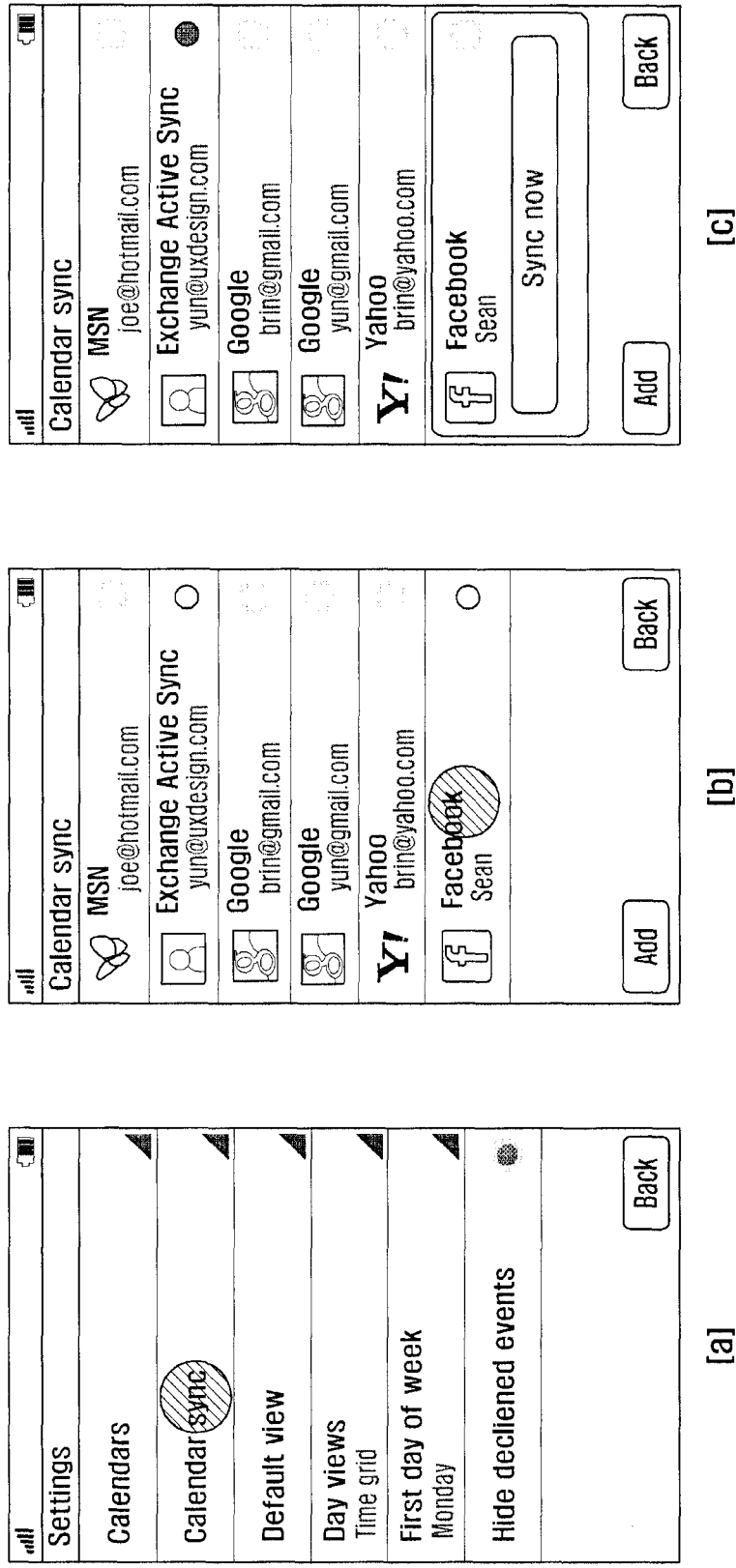
FIG. 31 is a diagram illustrating exemplary screen images provided for an information provision method according to still another embodiment of the present invention.

FIG. 31 is a diagram illustrating exemplary screen images provided for an information provision method according to still another embodiment of the present invention. FIG. 31 shows an exemplary case for synchronizing a calendar stored in the mobile terminal with a web calendar in the calendar menu.

The calendar menu setting screen according to an embodiment of the present invention includes a calendar synchronization menu. Part [a] of FIG. 31 shows the calendar menu settings screen in the state where the calendar synchronization menu item is selected.

If an input for selecting the calendar synchronization menu item is detected, the control unit 160 controls such that a list of the web and SNS accounts supporting the calendar service among all the web and SNS accounts registered in the mobile terminal 100 by means of the display unit 150. If the user selects one of the accounts from the list, the control unit 160 accesses the server managing the selected account by means of the RF unit 110 to download the updates of the calendar and reflects the update to the internal calendar of the mobile terminal 100. Particularly, the control unit 160 can receive an event list containing events such as birthdays from the SNS server and updated the internal calendar of the mobile terminal 100 with the received event list. In an embodiment of the present invention, the control unit 160 controls such that the web and SNS accounts are itemized with different tags distinguished by color. Part [b] of FIG. 31 shows an exemplary calendar synchronization menu screen in which the SNS account "Facebook" is selected by the user, and part [c] of FIG. 31 shows an exemplary Facebook calendar synchronization screen displayed when the SNS account "Facebook" is selected in the calendar synchronization menu screen. Through the Facebook calendar synchronization screen, the internal calendar of the mobile terminal 100 can be synchronized with the Facebook calendar.

In an embodiment of the present invention, the mobile terminal can be provided with a menu for configuring the calendar synchronization interval such that the user configures the calendar synchronization interval with this menu. If the calendar synchronization interval is configured by the user, the control unit 160 starts a timer and accesses, when the timer indicates the calendar synchronization time, the web server or SNS server by means of the RF unit 110 to updates the internal calendar of the mobile terminal 100 with the calendar update downloaded from the server.

The user can synchronize the internal calendar of the mobile terminal 100 with the web calendar through the calendar menu and manages the events in an integrated manner.

As described above, the information provision method for a mobile terminal according to the present invention is advantageous to manage all of the SMS, MMS, email, SNS, and IM accounts that are registered by the user through an integrated menu and execute the corresponding communication applications efficiently. Also, the information provision method for a mobile terminal according to the present invention allows the user to check a plurality of accounts of a counterpart and the communication information items of individual accounts at a time using an integrated menu, resulting in user convenience of the social communication activities using the mobile terminal.

Note that the above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An information interface method for a mobile device to manage a plurality of communication accounts, comprising:
    configuring a screen that displays a plurality of identity information items associated with a specific contact, the screen further including selectable icons for respective communication history, social network service (SNS) activity and media associated with the contact;
    detecting an input for selecting an integrated contact management menu;
    displaying the plurality of identity information items or a plurality of communication information items associated with each identity information item in an integrated manner; and
    displaying a first new screen including communication history items associated with the specific contact responsive to a selection of the communication history icon;
    displaying a second new screen including activity items associated with the specific contact and retrieved from a SNS, responsive a selection of the SNS activity icon; and
    displaying a third new screen including media items associated with the specific contact, responsive to a selection of the media icon;
    wherein the media items include a plurality of photos registered in association with the specific contact and retrieved from a storage unit of the mobile device displayed in a first display region, a plurality of photos retrieved from first and second SNSs displayed in respective second and third display regions, and a key designated for retrieving additional photos associated only with the specific contact and located in between the second and third display regions, wherein when a user selection of the key is detected, additional photos associated with the specific contact are retrieved from the first or second SNSs and displayed on the screen.

2. The method of claim 1, wherein configuring comprises:
selecting a contact creation menu from a contact list menu;
displaying a contact creation menu screen having a contact name entry box and a plurality of identity information entry boxes;
receiving a contact name and a plurality of identity information entered in the contact name and identity information entry boxes; and
saving the contact name and identity information matched in association with each other.

3. The method of claim 2, wherein the contact creation menu screen comprises a contact name entry box, a contact information storage selection menu, a phone number entry box, and a instant messenger identity entry box.

4. The method of claim 1, wherein configuring comprises:
selecting an address import menu from a contact list menu;
displaying a list of accounts registered previously in the mobile device;
displaying, when an account is selected from the list, an address book of the selected account; and
adding, when at least one address is selected from the address book, the at least one address to a contact list.

5. The method of claim 4, wherein configuring comprises:
selecting a contact from the contact list and then a link menu;
selecting at least one other contact to be linked to the selected contact; and
configuring contact information of the selected contacts into a contact.

6. The method of claim 5, wherein a list of accounts comprises at least one of email, social network service (SNS), and instant messenger (IM) accounts.

7. The method of claim 6, wherein configuring contact information comprises matching at least one of phone number, email account, social network service account, and instant messenger account to the contact name.

8. The method of claim 1, wherein the activity items are retrieved from a plurality of SNS accounts associated with the contact.

9. A mobile device configured to perform the method of claim 1.

10. An information interface method for a mobile device to manage a plurality of communication accounts, comprising:
registering a plurality of identity information items of a user of the mobile device;
detecting an input on a particular icon for selecting an integrated identity management menu, the icon including a sub-region containing a numeral representing a total number of unchecked messages summed from short message service (SMS) or multimedia message service (MMS) messages, email messages and social network service (SNS) messages;
in response to the detected input on the particular icon, displaying a screen with a plurality of communication information items associated with a registered identity information item in an integrated manner, the plurality of communication information items including an item for SMS/MMS messages, an item for email messages, and a plurality of social network service (SNS) fields associated with user accounts of different SNS providers, each field displaying a first icon identifying a service provider and selectable to execute an application of that SNS, and a second icon indicative of messages from that SNS and selectable to launch a new screen displaying SNS messages for the user and retrieved from that SNS;
generating an internal calendar of the mobile device;
providing a user menu for configuring a calendar synchronization interval;
displaying a calendar sync menu item;
in response to a detected selection of the calendar sync menu item, displaying an integrated list of email and SNS accounts from which to select for syncing calendar information;
detecting a selection of an account from the integrated list for the syncing;
syncing calendar information of the internal calendar with the selected account so as to update the internal calendar with a calendar update downloaded from a web server for the selected account at the calendar synchronization interval.

11. The method of claim 10, wherein registering comprises:
displaying, when a "my account" menu item is selected, a new account registration menu;
displaying, when the new account registration menu is selected, a web list and a social network service list;
displaying, when one of the web list and social network service list is selected, an account entry box and a password entry box; and
registering, when an account and a password are entered, the entered account and password to the my account menu.

12. The method of claim 10, further comprising displaying, on the screen with a plurality of communication information items, an instant messenger item, and a composition menu item; and
detecting an input for selecting one of the items in the integrated communication menu screen.

13. The method of claim 12, wherein displaying an integrated communication menu screen comprises:
presenting, when the SMS/MMS message item is selected, an inbox of a SMS or a MMS;
presenting, when the email account item is selected, an inbox of an email account represented by the selected email account item;
presenting, when the social network service item is selected, upload messages of a social network service account represented by the selected social network service item; and
presenting, when the instant messenger item is selected, an execution screen of an instant messenger represented by the instant messenger item.

14. The method of claim 13, wherein displaying an integrated communication menu screen comprises:
presenting, when the composition menu item is selected, a communication medium list containing SMS/MMS, email, and social network service;
detecting an input for selecting a communication medium from the communication medium list; and
presenting a composition window corresponding to the selected communication medium.

15. The method of claim 10, wherein detecting comprises:
detecting an input for selecting an email menu;
displaying an integrated email item and at least one individual email item; and
detecting an input for selecting one of the email items.

16. The method of claim 15, wherein displaying an integrated email item and at least one individual email item comprises:
presenting, when the integrated email item is selected, emails stored in inboxes of all email accounts registered in the mobile device in order of received times; and presenting, when an individual email item is selected, emails stored in an inbox of an email account represented by the selected email item.

17. The method of claim 10, wherein detecting comprises selecting an integrated social network service menu, and display comprises:
- checking at least one social network service account registered in the mobile device;
- accessing the at least one social network service account checked;
- receiving upload messages of the at least one social network service account accessed; and
- displaying the received upload messages in order of upload times.

18. A mobile device for managing a plurality of communication accounts, comprising:
- a control unit which configures a screen that displays a plurality of identity information items associated with a specific contact, the screen further including a selectable media icon to retrieve media items associated with the contact;
- an input unit which receives an input for selecting an integrated contact management menu or an integrated identity management menu;
- a storage unit which stores media items; and
- a display unit which displays the configured identity information items or a plurality of communication information items associated with each identity information item;

wherein the display unit displays a new screen in response to a selection of the media icon, the new screen including a plurality of photos registered in association with the specific contact and retrieved from the storage unit in a first display region, a plurality of photos retrieved from each of first and second social network services associated with the contact in respective second and third display regions, and a key designated for retrieving additional photos associated only with the specific contact and located in between the second and third display regions, wherein when a user selection of the key is detected, additional photos associated with the specific contact are retrieved from the first or second SNSs and displayed on the screen.

19. The mobile device of claim 18, wherein the controller links and displays individual contact information to the specific contact item.

* * * * *